US012795642B2

(12) United States Patent
Goektepe et al.

(10) Patent No.: US 12,795,642 B2
(45) **Date of Patent: *Nov. 10, 2026**

(54) USER EQUIPMENT, BASE STATION, WIRELESS COMMUNICATION NETWORK, DATA SIGNAL AND METHOD TO PROVIDE ENHANCED SPS CONTROL AND CONTINUOUS SPS AFTER HANDOVER

(71) Applicant: KONINKLIJKE PHILIPS N.V., Eindhoven (NL)

(72) Inventors: Baris Goektepe, Berlin (DE); Thomas Fehrenbach, Berlin (DE); Lars Thiele, Berlin (DE); Yago Sanchez de la Fuente, Berlin (DE); Thomas Wirth, Berlin (DE); Cornelius Hellge, Berlin (DE); Thomas Schierl, Berlin (DE)

(73) Assignee: Koninklijke Phiips N.V., Eindhoven (NL)

( * ) Notice: Subject to any disclaimer, the term of this patent is extended or adjusted under 35 U.S.C. 154(b) by 125 days.

This patent is subject to a terminal disclaimer.

(21) Appl. No.: 17/178,465

(22) Filed: Feb. 18, 2021

(65) Prior Publication Data

US 2021/0176775 A1 Jun. 10, 2021

Related U.S. Application Data

(63) Continuation of application No. 16/401,618, filed on May 2, 2019, now Pat. No. 10,945,278, which is a (Continued)

(30) Foreign Application Priority Data

Nov. 3, 2016 (EP) .................................... 16197182

(51) Int. Cl.
*H04W 72/1263* (2023.01)
*H04W 36/00* (2009.01)
(Continued)

(52) U.S. Cl.
CPC ... *H04W 72/1263* (2013.01); *H04W 36/0033* (2013.01); *H04W 36/0072* (2013.01);
(Continued)

(58) Field of Classification Search
CPC ......... H04W 36/0033; H04W 36/0072; H04W 36/08; H04W 72/042; H04W 72/0446;
(Continued)

(56) References Cited

U.S. PATENT DOCUMENTS 2,156,623 A 5/1939 Eastus
8,706,129 B2 * 4/2014 Wu ....................... H04W 72/02 370/329

(Continued)

FOREIGN PATENT DOCUMENTS

CN 106416404 A * 2/2017 ......... H04L 27/2602
CN 108124290 B * 5/2020 ............ H04W 36/00

(Continued)

OTHER PUBLICATIONS

"LTE Handovers—Intra E-UTRAN Handover." LTE Handovers—Intra E-UTRAN Handover, LTE World, Apr. 10, 2010, 4g5gworld.com/blog/lte-handovers-intra-e-utran-handover.

(Continued)

*Primary Examiner* — Eric Nowlin

(57) ABSTRACT

In the field of wireless communication networks or systems in which a user equipment is configured with semi-persistent scheduling, a first aspect of the invention provides for continuous or non-interrupted SPS of the user equipment after a handover, and a second aspect of the invention provides an enhanced control signaling for a user equipment configured with SPS to reduce the signaling overhead.

20 Claims, 15 Drawing Sheets

Related U.S. Application Data continuation of application No. PCT/EP2017/077299, filed on Oct. 25, 2017.

(51) Int. Cl.
*H04W 72/0446* (2023.01)
*H04W 72/12* (2023.01)
*H04W 72/20* (2023.01)
*H04W 72/23* (2023.01)

(52) U.S. Cl.
CPC ....... *H04W 72/0446* (2013.01); *H04W 72/12* (2013.01); *H04W 72/20* (2023.01); *H04W 72/23* (2023.01)

(58) Field of Classification Search
CPC ......... H04W 72/1205; H04W 72/1263; H04W 72/1278
See application file for complete search history.

(56) References Cited

U.S. PATENT DOCUMENTS

| | | | | |
|---|---|---|---|---|
| 8,805,391 | B2 * | 8/2014 | Wu | H04W 72/02 370/328 |
| 9,001,778 | B2 * | 4/2015 | Chin | H04W 36/0005 370/466 |
| 9,398,511 | B2 | 7/2016 | Zhang et al. | |
| 9,504,037 | B2 * | 11/2016 | Yi | H04W 72/04 |
| 10,321,477 | B2 * | 6/2019 | Lim | H04W 72/52 |
| 10,383,023 | B1 | 8/2019 | Hahn | |
| 10,455,550 | B2 * | 10/2019 | Nogami | H04W 72/20 |
| 10,477,527 | B2 | 11/2019 | Jiang et al. | |
| 10,492,107 | B2 | 11/2019 | Park et al. | |
| 10,716,131 | B2 * | 7/2020 | Feng | H04W 72/042 |
| 10,820,337 | B2 | 10/2020 | Hou et al. | |
| 11,096,209 | B2 * | 8/2021 | Li | H04W 72/1205 |
| 2008/0037578 | A1 | 2/2008 | Carlson et al. | |
| 2009/0003282 | A1 | 1/2009 | Meylan et al. | |
| 2010/0113058 | A1 * | 5/2010 | Wu | H04W 72/02 455/452.1 |
| 2012/0163250 | A1 * | 6/2012 | Chin | H04W 56/001 370/328 |
| 2012/0172044 | A1 * | 7/2012 | Wu | H04W 72/02 455/436 |
| 2012/0176996 | A1 | 7/2012 | Kim et al. | |
| 2013/0064224 | A1 | 3/2013 | Wang et al. | |
| 2013/0223301 | A1 | 8/2013 | Lee et al. | |
| 2013/0258914 | A1 * | 10/2013 | Seo | H04J 3/1694 370/280 |
| 2013/0265987 | A1 | 10/2013 | Ramachandran et al. | |
| 2013/0301582 | A1 * | 11/2013 | Jiang | H04W 72/23 370/329 |
| 2014/0242960 | A1 | 8/2014 | Cai et al. | |
| 2014/0242989 | A1 | 8/2014 | Cai et al. | |
| 2014/0286243 | A1 | 9/2014 | Yamada | |
| 2015/0124775 | A1 | 5/2015 | Guo | |
| 2015/0201356 | A1 | 7/2015 | Wang et al. | |
| 2015/0257150 | A1 * | 9/2015 | Yi | H04B 7/26 370/329 |
| 2015/0282030 | A1 | 10/2015 | Vrind et al. | |
| 2015/0282126 | A1 * | 10/2015 | Park | H04W 72/0446 370/329 |
| 2016/0135095 | A1 | 5/2016 | Wu | |
| 2016/0278053 | A1 * | 9/2016 | Lee | H04L 5/0048 |
| 2017/0019887 | A1 | 1/2017 | Jiang et al. | |
| 2017/0064628 | A1 | 3/2017 | Wang et al. | |
| 2017/0071010 | A1 * | 3/2017 | Lim | H04W 72/21 |
| 2017/0118745 | A1 * | 4/2017 | Nogami | H04W 72/20 |
| 2017/0257803 | A1 * | 9/2017 | Tenny | H04W 36/0088 |
| 2018/0020472 | A1 | 1/2018 | Lin et al. | |
| 2018/0049073 | A1 | 2/2018 | Dinan et al. | |
| 2018/0049225 | A1 | 2/2018 | Lee et al. | |
| 2018/0124648 | A1 | 5/2018 | Park et al. | |
| 2018/0324839 | A1 * | 11/2018 | Feng | H04W 72/1205 |
| 2018/0332606 | A1 | 11/2018 | Lee et al. | |
| 2019/0037555 | A1 | 1/2019 | Kim et al. | |
| 2019/0082489 | A1 | 3/2019 | Fujishiro et al. | |
| 2019/0174522 | A1 | 6/2019 | Xiao et al. | |
| 2019/0215803 | A1 * | 7/2019 | Van Phan | H04W 16/14 |
| 2019/0239248 | A1 | 8/2019 | Zhang et al. | |
| 2019/0253946 | A1 | 8/2019 | Hahn | |
| 2019/0261395 | A1 | 8/2019 | Goektepe et al. | |
| 2019/0327587 | A1 | 10/2019 | Hahn | |
| 2019/0349836 | A1 | 11/2019 | Lee et al. | |
| 2019/0357064 | A1 | 11/2019 | Hosseini et al. | |
| 2020/0037341 | A1 | 1/2020 | Hou et al. | |
| 2020/0078909 | A1 | 3/2020 | Park et al. | |
| 2020/0120466 | A1 * | 4/2020 | Rajagopal | H04W 72/23 |
| 2020/0178217 | A1 | 6/2020 | Huang et al. | |
| 2020/0329489 | A1 * | 10/2020 | Li | H04W 72/1289 |
| 2021/0360652 | A1 * | 11/2021 | Awoniyi-Oteri | H04L 1/1621 |
| 2022/0014981 | A1 * | 1/2022 | Pedersen | H04L 1/1887 |
| 2022/0131673 | A1 * | 4/2022 | Huang | H04L 1/001 |
| 2022/0394730 | A1 * | 12/2022 | Lee | H04W 72/1273 |

FOREIGN PATENT DOCUMENTS

| | | | | |
|---|---|---|---|---|
| EP | 3101975 | A1 * | 12/2016 | H04L 27/2602 |
| JP | 2011527147 | A | 10/2011 | |
| JP | 2016096548 | A | 5/2016 | |
| JP | 2016184954 | A | 10/2016 | |
| JP | 6499976 | B2 * | 4/2019 | H04L 27/2602 |
| KR | 20140090268 | A | 7/2014 | |
| RU | 2429578 | C2 | 9/2011 | |
| WO | WO-2006012405 | A2 | 2/2006 | |
| WO | WO-2008137959 | A2 | 11/2008 | |
| WO | WO-2010002692 | A1 | 1/2010 | |
| WO | WO-2013038525 | A1 | 3/2013 | |
| WO | WO-2015115454 | A1 * | 8/2015 | H04L 27/2602 |
| WO | WO-2017183897 | A1 * | 10/2017 | H04L 1/00 |
| WO | WO-2020094210 | A1 * | 5/2020 | H04L 1/1887 |

OTHER PUBLICATIONS

3GPP, LTE; Evolved Universal Terrestrial Radio Access (E-UTRA); Radio Resource Control (RRC); Protocol specification, 3GPP TS 36.331 V12.7.0 (Release 12). http://www.3gpp.org. Oct. 2015.

3GPP, Technical Specification Group Radio Access Network; Evolved Universal Terrestrial Radio Acces (E-UTRA) Radio Resource Control (RRC); Protocol specification TS 36.331 V9.0.0, Sep. 1, 2009 (Release 9), pp. 1-205.

3GPP, Technical Specification Group Radio Access Network; Evolved Universal Terrestrial Radio Access (E-UTRA); MAC protocol specification, 3GPP TS 36.321 V13.1.0 (Mar. 2016) (Release 13), http://www.3gpp.org.

3GPP, Technical Specification Group Radio Access Network; Evolved Universal Terrestrial Radio Access (E-UTRA); Physical layer procedures, Section 9.2, 3GPP TS 36.213 V13.1.1 (Mar. 2016) (Release 13), http://www.3gpp.org.

3GPP, Technical Specification Group Radio Access Network; Evolved Universal Terrestrial Radio Access (E-UTRA); Radio Resource Control (RRC); Protocol specification, 3GPP TS 36.331 V13.1.0 (Apr. 2016) (Release 13), p. 354. http://www.3gpp.org.

ISA/EP, International Search Report and Written Opinion, Jan. 9, 2019, re PCT International Patent Application No. PCT/EP2017/077299.

Johnson, C. "Long Term Evolution In Bullets 2nd Edition." Publisher: Create Space. (2012). p. 462.

Pasupuleti, Kumar Swamy. "Semi-Persistent Scheduling." How LTE Stuff Works?, Oct. 6, 2013, http://howltestuffworks.blogspot.com/2013/10/semi-persistent-scheduling.html.

Rupto, Office Action with English Translation, Dec. 13, 2019 re Russian Patent Application No. 2019116857.

LG Electronics Inc: "SL SPS configuration and UE assistant information", 3GPP Draft; R2-165693 SL SPS, 3rd Generation Partnership Project (3GPP), vol. RAN WG2, No. Gothenburg, Sweden; Aug. 22-Aug. 26, 2016.

Samsung, "Support of multiple UL SPS configurations", 3GPP TSG RAN WG1 #86bis, Oct. 2016, R1-1608987.

(56) References Cited

OTHER PUBLICATIONS

LENOVO: "Discussion on DCI design to support multiple SPS configurations",3GPP Draft; R1-1609401, 3rd Generation Partnership Project (3GPP), Mobile Competence Centre ; 650, Route Des Lucioles ; F-06921 Sophia-Antipolis Cedex ; France, vol. RAN WG1, No. Lisbon, Portugal; Oct. 10-Oct. 14, 2016 Oct. 9, 2016 (Oct. 9, 2016), XP051149444, Retrieved from the Internet: URL:http://www.3gpp.org/ftp/Meetings_3GPP_SYNC/RAN1/Docs/ [retrieved on Oct. 9, 2016].

ZTE: "Trigger and release of V2V SPS resources", 3GPP Draft; R1-164963—Trigger and Release of V2V SPS, 3rd Generation Partnership Project (3GPP), Mobile Competence Centre ; 650, Route Des Lucioles ; F-06921 Sophia-Antipolis Cedex ; France, vol. RAN WG1, No. Nanjing, China; May 23-May 27, 2016 May 13, 2016 (May 13, 2016), XP051096800, Retrieved from the Internet: URL:http://www.3gpp.org/ftp/tsg_ran/WG1_RL1/TSGR1_85/Docs/ [retrieved on May 13, 2016].

NTT DOCOO Huawei Panasonic . . . : "Way forward on (E)PDCCH used for multiple SPS configurations",3GPP Draft; R1_165699_WF on V2V PDCCH_V2, 3rd Generation Partnership Project (3GPP), Mobile Competence Centre ; 650, Route Des Lucioles ; F-06921 Sophia-Antipolis Cedex ; France, vol. RAN WG1, No. Nanjing, China; May 23-May 27, 2016 May 30, 2016 (May 30, 2016), XP051111644, Retrieved from the Internet: URL:http://www.3gpp.org/ftp/tsg_ran/WG1_RL1/TSGR1_85/Docs/ [retrieved on May 30, 2016].

Ericsson: "Discussion on UU Enhancements for V2X",3GPP Draft; R2-161565—Discussion on UU Enhancements for V2X, 3rd Generation Partnership Project (3GPP), Mobile Competence Centre ; 650, Route Des Lucioles ; F-06921 Sophia-Antipolis Cedex ; France, vol. RAN WG2, No. Malta; Feb. 15-Feb. 19, 2016 Feb. 6, 2016 (Feb. 6, 2016), XP051065845, Retrieved from the Internet: URL:http://www.3gpp.org/ftp/tsg_ran/WG2_RL2/TSGR2_93/Docs/ [retrieved on Feb. 6, 2016].

* cited by examiner

```
– ASN1START
SPS-Config ::= SFQUENCE {
	sps-ConfigDL SPS-ConfigDL		OPTIONAL, --NeedON
	sps-ConfigUL SPS-ConfigUL		OPTIONAL, --NeedON
}

SPS-ConfigDL ::= CHOICE{
	release NULL,
	setup SEQUENCE {
		semiPersistSchedIntervalDL ENUMERATED {
			sf10, sf20, sf32, sf40, sf64, sf80,
			sf128, sf160, sf320, sf640, spare6,
			spare5, spare4, spare3, spare2,
			spare1},
		numberOfConfSPS-Processes INTEGER (1..8),
		n1PUCCH-AN-PersistentList N1PUCCH-AN-PersistentList,
		...,
		[[ twoAntennaPortActivated-r10 CHOICE {
			release NULL,
			setup SEQUENCE {
				n1PUCCH-AN-PersistentListP1-r10 N1PUCCH-AN-PersistentList
			}
		} OPTIONAL --Need ON
		]]
	}
}

SPS-ConfigUL ::= CHOICE {
	release NULL,
	setup SEQUENCE {
		semiPersistSchedIntervalUL ENUMERATED {
			sf10, sf20, sf32, sf40, sf64, sf80,
			sf128, sf160, sf320, sf640, spare6,
			spare5, spare4, spare3, spare2,
			spare1},
		implicitReleaseAfter ENUMERATED {e2, e3, e4, e8},
			p0-Persistent  SEQUENCE {
			p0-NominalPUSCH-Persistent  INTEGER  (-126..24),
			p0-UE-PUSCH-Persistent  INTEGER (-8..7)
		} OPTIONAL, -- Need OP
		twoIntervalsConfig ENUMERATED {true} OPTIONAL, --Cond TDD
		...,
		[[ p0-PersistentSubframeSet2-r12 CHOICE {
			release NULL,
			setup SEQUENCE {
				p0-NominalPUSCH-PersistentSubframeSet2-r12  INTEGER  (-126..24},
				p0-UE-PUSCH-PersistentSubframeSet2-r12  INTEGER  (-8..7)
			}
		} OPTIONAL -- Need ON
		]]
	}
}
N1PUCCH-AN-PersistentList ::= SEQUENCE (SIZE (1..4)) OF INTEGER (0..2047)
--ASN1STOP
```

Fig. 3

```
-ASN1START
SPS-Config ::= SEQUENCE {
        newSemiPersistSchedC-RNTI          C-RNTI        OPTIONAL, --Need OR    130
        oldSemiPersistSchedC-RNTI      C-RNTI        OPTIONAL, --Need OR    132
        sps-ConfigDL  SPS-ConfigDL                   OPTIONAL, --Need ON
        sps-ConfigUL  SPS-ConfigUL                   OPTIONAL, --Need ON
}

SPS-ConfigDL ::= CHOICE{
        release NULL,
        update NULL,    134
        setup SEQUENCE {
                ...                               time to next SPS    138
        }
}

SPS-ConfigUL ::= CHOICE {
        release NULL,
        update NULL,    136
        setup SEQUENCE {
                ...
        }
}
-ASN1STOP
```

Fig. 7

```
SPS-ConfigDL ::= CHOICE{
        release NULL,
        update NULL,
        setup SEQUENCE {
                keepOnHandover CHOICE {     }
                        keep NULL,          } 140
                        release NULL        }
                },
                ...
        }
}

SPS-ConfigUL ::= CHOICE{
        release NULL,
        update NULL,
        setup SEQUENCE {
                keepOnHandover CHOICE {     }
                        keep NULL,          } 142
                        release NULL        }
                },
                ...
        }
}
--ASN1STOP
```

Fig. 8

USER EQUIPMENT, BASE STATION, WIRELESS COMMUNICATION NETWORK, DATA SIGNAL AND METHOD TO PROVIDE ENHANCED SPS CONTROL AND CONTINUOUS SPS AFTER HANDOVER

CROSS-REFERENCE TO RELATED APPLICATIONS

This application is a continuation of copending U.S. application Ser. No. 16/401,618 filed May 2, 2019, which is a 371 continuation of PCT Application No. PCT/EP2017/077299 filed Oct. 25, 2017, and claims priority from European Application No. 16197182.5 filed Nov. 3, 2016, all of which are incorporated herein by reference in its entirety.

The present invention concerns the field of wireless communication networks or systems, more specifically, wireless communication networks in which a user equipment is configured with semi-persistent scheduling (SPS). A first aspect of the inventive approach provides for continuous or non-interrupted SPS of the user equipment after a handover. A second aspect of the inventive approach provides an enhanced control signaling for a user equipment configured with SPS to reduce the signaling overhead.

BACKGROUND OF THE INVENTION

FIG. 1 is a schematic representation of an example of a network infrastructure, such as a wireless communication network or wireless communication system, including a plurality of base stations $eNB_1$ to $eNB_5$, each serving a specific area surrounding the base station schematically represented by the respective cells $\mathbf{100}_1$ to $\mathbf{100}_5$. The base stations are provided to serve users within a cell. A user may be a stationary device or a mobile device. Further, the wireless communication system may be accessed by IoT devices which connect to a base station or to a user. IoT devices may include physical devices, vehicles, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users UE1 and UE2, also referred to as user equipment (UE), that are in cell $\mathbf{100}_2$ and that are served by base station $eNB_2$. Another user $UE_3$ is shown in cell $\mathbf{100}_4$ which is served by base station $eNB_4$. The arrows $\mathbf{102}_1$, $\mathbf{102}_2$ and $\mathbf{102}_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $\mathbf{104}_1$ and $\mathbf{104}_2$ in cell $\mathbf{100}_4$, which may be stationary or mobile devices. The IoT device $\mathbf{104}_1$ accesses the wireless communication system via the base station $eNB_4$ to receive and transmit data as schematically represented by arrow $\mathbf{106}_1$. The IoT device $\mathbf{104}_2$ accesses the wireless communication system via the user $UE_3$ as is schematically represented by arrow $\mathbf{106}_2$.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used.

For data transmission a physical resource grid may be uses, as defined, e.g., by the LTE standard. The physical resource grid may comprise a set of resource elements to which various physical channels and physical signals are mapped. For example, in accordance with the LTE standard, the physical channels may include the physical downlink shared channel (PDSCH) carrying user specific data, also referred to as downlink payload data, the physical broadcast channel (PBCH) carrying for example the master information block, the physical downlink control channel (PDCCH) carrying for example the downlink control information (DCI), etc. The physical signals may comprise reference signals (RS), synchronization signals and the like. The LTE resource grid comprises a 10 milliseconds frame in the time domain having a given bandwidth in the frequency domain. The frame has 10 subframes of 1 millisecond length, and each subframe includes two slots of 6 or 7 OFDM symbols depending on the cyclic prefix (CP) length. The PDCCH may be defined by a pre-defined number of OFDM symbols per slot. For example, the resource elements of the first three symbols may be mapped to the PDCCH, i.e., the size of the PDCCH is limited. Consequently, the number of also limits how many DCIs is limited that may be carried in one subframe. This may, in turn, limit the number of UEs which may receive an allocation for the subframe when using dynamic scheduling.

FIG. 2 shows an example of a LTE OFDMA-based subframe with two antenna ports for different selected Tx antenna ports. The subframe includes two resource blocks (RB) each made up of one slot of the subframe and 12 subcarriers in the frequency domain. The subcarriers in the frequency domain are shown as subcarrier 0 to subcarrier 11, and in the time domain, each slot includes 7 OFDM symbols, e.g. in the slot 0 OFDM symbols 0 to 6 and in slot 1 OFDM symbols 7 to 13. A resource element is made up of one symbol in the time domain and one subcarrier in the frequency domain. The white boxes 10 represent resource elements allocated to the PDSCH carrying the payload or user data, also referred to a payload region. The resource elements for the physical control channels (carrying non-payload or non-user data), also referred to the control region, are represented by the hatched boxes 12. In accordance with examples, resource elements 12 may be allocated to the PDCCH, to the physical control format indicator channel (PCFICH), and to the physical hybrid ARO indicator channel (PHICH). The cross-hatched boxes 14 represent resource elements which are allocated to the RS that may be used for the channel estimation. The black boxes 16 represent unused resources in the current antenna port that may correspond to RSs in another antenna port.

The resource elements 12, 14, 16 allocated to the physical control channels and to the physical reference signals are not evenly distributed over time. More specifically, in slot 0 of the subframe the resource elements associated with the symbol 0 and the symbol 1 are allocated to the physical control channels or to the physical reference signals, no resource elements in the symbols 0 and 1 are allocated to payload data. The resource elements associated with symbol 4 in slot 0 as well as the resource elements associated with symbols 7 and 11 in slot 1 of the subframe are allocated in part to the physical control channels or to the physical reference signals. The white resource elements shown in FIG. 2 may carry symbols associated with payload data or user data and in the slot 0 for symbols 2, 3, 5 and 6, all resource elements 10 may be allocated to payload data, while less resource elements 10 are allocated to payload data in symbol 4 of slot 0, and no resource element is allocated to payload data in symbols 0 and 1. In slot 1 the resource elements associated with symbols 8, 9, 10, 12 and 13 are all allocated to payload data, while for symbols 7 and 11 less resource elements are allocated to payload data.

The duration of the subframe is 1 millisecond, and in accordance with the LTE standard, the TTI is 1 millisecond. When transmitting data using the resource grid structure shown in FIG. 2, the receiver, for example the mobile terminal or mobile user, receives the resource elements depicted in FIG. 2 in 1 millisecond. The information contained or defined by the resource elements may be processed, and for each transmission, i.e., for each TTI having the 1 millisecond length, a constant number of payload data is received. The transmission scheme leads to an end-to-end latency of more than 1 millisecond, as the receiver first receives a transmission having a duration of 1 millisecond and then, once the transmission is completed, processes the control information to see whether some data has been sent to the receiver, and in case it is true, the receiver decodes the data channel of a length of 1 millisecond. Thus, the duration of the transmission and the processing time add up to a period exceeding 1 millisecond.

As explained above, the PDCCH is defined by a predefined number of OFDM symbols, i.e., there the size the PDCCH is limited which, consequently, also limits how many DCIs may be carried in one subframe having a length of 1 millisecond. This may, in turn, limit the number of UEs which may receive an allocation for the subframe when using dynamic scheduling. To support more allocations, without increasing the size of the PDCCH, semi-persistent scheduling (SPS) may be used. When using SPS, the UE is pre-configured by the transmitter or base station with a SPS C-RNTI (radio network temporary identifier), also be referred to as an allocation ID, and a periodicity. Once pre-configured, the UE may receive a further message defining an allocation for a downlink and/or uplink transmission of data on the basis of the associated SPS C-RNTI. This allocation will repeat according to the pre-configured periodicity (SPS interval). In other words, once allocated, the resources may be repeatedly used for receiving/transmitting data by the UE without the need to perform scheduling in each subframe. In case the radio link conditions change, the base station may provide to the UE a resource allocation message for re-allocating resources.

The SPS scheme is described, for example, in references [1] and [2]. SPS is a combination of persistent and dynamic scheduling. The persistent scheduling is used for the allocation of periodic resources intended for a transmission of transport blocks, and the dynamic scheduling is used for potentially needed incremental redundancy, i.e. hybrid automatic repeat request (HARQ) retransmissions. SPS allows for the reduction of control information overhead that originates, for example, from signaling the downlink (DL) and uplink (UL) resource allocation patterns at times where a connection needs to transfer data. SPS may be used both for the DL and UL of both FDD (frequency division duplexing) and TDD (time division duplexing). Reference [3] describes the initial configuration and the following activation/release of SPS. The base station may configure the UE to perform SPS at any time. Typically, this is done at the time of the dedicated bearer establishment for the service by RRC (radio resource control). The SPS may be configured/re-configured by RRC at any time using a configuration message that is also referred to as "SPS-Config". The SPS-Config message may include the SPS C-RNTI as well as configuration information for the downlink and for the uplink. The configuration message does not allow a UE to start the SPS, rather, the base station serving the UE has to explicitly activate SPS so as to allow the UE to use SPS grants/assignments.

Once the UE has received the SPS-Config message including the SPS C-RNTI associated with the UE, the UE may be configured by higher layers to decode the PDCCH with CRC (cyclic redundancy check) scrambled by the SPS C-RNTI in every subframe, as the eNB may activate/release SPS at any time using a DCI message. A SPS activation/release message is validated by the UE as is explained in detail in reference [4].

After a valid activation, the UE decodes the PDCCH for CRC scrambled by the SPS C-RNTI to check for SPS-validated DCI control information in every SPS subframe, i.e., in every subframe as defined by the SPS interval, the UE looks for information regarding possible changes, e.g. changes in the assigned resources, in the transmission mode, the MCS (modulation and coding scheme) or the like. The assignment of the resource blocks within the subframe is subject to the choice of the base station, and in case the UE does not receive any SPS-validated DCI, the resource block assignment and the other transmission parameters, like transmission mode and MCS, remain as currently configured, thereby avoiding a control signaling overhead.

SPS is used for services with periodic resource demands, and different applications may entail different arrival times of transport blocks which may be configured by the SPS interval parameters. For example, Voice over IP (VoIP) is an application where data arrives in periodic bursts of 20 milliseconds. Beyond that, as mentioned above, there are mission-critical and latency-constrained communications services; for example, URLLC (ultra reliable low latency communication) services, such as in machine-type communication and in vehicular communication, which need pre-configured resources in shorter periods of time; for example, in periods of below 10 milliseconds down to the micro-second level and below. Applying SPS to such applications or services leads to the least possible signaling overhead when compared to frequent dynamic configuration updates, and embodiments of the present invention address SPS for such latency-constrained applications.

Further, for the aforementioned latency-constrained applications, but also for conventional applications, respective services and higher OSI layers, such as on the Application Layer, as well as rate-controlled protocols on the Network Layer (for example, TCP), may gain performance in terms of network throughput, adapt ion latency or RTT (round trip time) reduction if SPS may be directly influenced and/or adapted by the application, service or protocol.

FIG. 3 shows an example of a conventional SPS configuration provided by RRC (see reference [5]). The configuration parameters "semi-persistentschedintervalDL" and "semi-persistentschedintervalUL" are based on a 4-bit field indicating an enumeration of 16 different modes for the SPS intervals, also referred to as SPS periods. From the 16 configurable modes, there is a selection of 10 predefined periods which are labeled sfN for a scheduling period of N subframes, with N≥10. Further, 6 dynamically adjustable periods labeled spareX are provided. The base station provides the user equipment with an additional SPS-Config mode, using, for example, an RRC connection set up message, an RRC connection reconfiguration message or an RRC connection re-establishment message, as is outlined in reference [1]. The general dependency of the intervals or periods on the basis of multiples of a subframe, as defined in reference [2], i.e., the dependency on several milliseconds, is also valid for the spareX configurations; however, when using the spareX configuration, the SPS period may be lowered down to a minimum of 1 subframe (1 millisecond).

Thus, SPS may be used to reduce the control overhead for periodic transmissions. SPS may be for use cases such as voice over LTE, however, SPS is applicable to many more use cases which go together with different requirements as they may be encountered, e.g., in V2X (vehicle to everything) or V2V (vehicle to vehicle) scenarios. Such specific use cases may need more complex SPS configurations, including nested SPS configurations. For example, V2V and V2X scenarios involve a high speed movement of the use equipment so that cell handovers may happen quite frequently. Currently, all SPS configurations are lost on handover, i.e., when a user equipment moves from one cell to another cell of the wireless communication network so as to be no longer served by the currently responsible source base station but by a new target base station which is also referred to as a handover, the SPS configuration currently implemented in the UE is no longer maintained. This involves that the SPS configuration in the UE has to be reconfigured with the new or target base station.

In certain scenarios, such as the above mentioned V2X or V2V scenarios, the user equipment may be configured with more than one SPS configuration. For example, up to eight SPS configurations may be implemented in a user equipment in a V2X or a V2V scenario. Independent of the loss of the SPS configurations at handover, when configuring the user equipment in a scenario with multiple SPS configurations, additional control messages are needed, such as the above mentioned DCI messages. For each of the SPS configurations one DCI message is needed to activate the respective SPS configuration and another DCI message is needed to initially allocate resources for the SPS configuration or to re-allocate resources for the respective SPS configuration in case the channel quality changes. Thus, the increase in the number of SPS configurations with which a user equipment may be configured goes together with a corresponding increase in the number of control messages.

SUMMARY

An embodiment may have a user equipment, wherein the user equipment is configured to be served by a source base station of a source cell of a wireless communication network, the wireless communication network including a plurality of cells, each cell having a base station, the user equipment is configured with semi-persistent scheduling in accordance with a SPS configuration provided by the source base station, and the user equipment is configured to maintain SPS when moving from the source cell to a target cell of the wireless communication network, the target cell.

Another embodiment may have a base station, wherein the base station is a source base station associated with a source cell of a wireless communication network, the wireless communication network including a plurality of cells, each cell having a base station, the source base station is configured to serve a user equipment located in the source cell of the wireless communication network, and to configure the user equipment with semi-persistent scheduling in accordance with a SPS configuration, and the source base station is configured to transmit the SPS configuration to a target base station associated with a target cell, when the user equipment moves from the source cell to the target cell of the wireless communication network, or to transmit a new identifier for SPS control signaling to the UE for the target cell, when the source base station is for serving the source cell and the target cell.

According to another embodiment, a wireless communication network may have: a user equipment, wherein the user equipment is configured to be served by a source base station of a source cell of a wireless communication network, the wireless communication network including a plurality of cells, each cell having a base station, the user equipment is configured with semi-persistent scheduling in accordance with a SPS configuration provided by the source base station, and the user equipment is configured to maintain SPS when moving from the source cell to a target cell of the wireless communication network, the target cell, and a plurality of base stations, wherein the base station is a source base station associated with a source cell of a wireless communication network, the wireless communication network including a plurality of cells, each cell having a base station, the source base station is configured to serve a user equipment located in the source cell of the wireless communication network, and to configure the user equipment with semi-persistent scheduling in accordance with a SPS configuration, and the source base station is configured to transmit the SPS configuration to a target base station associated with a target cell, when the user equipment moves from the source cell to the target cell of the wireless communication network, or to transmit a new identifier for SPS control signaling to the UE for the target cell, when the source base station is for serving the source cell and the target cell.

According to another embodiment, a method may have the steps of: serving a user equipment by a source base station of a source cell of a wireless communication network, the wireless communication network including a plurality of cells, each cell having a base station, wherein the user equipment is configured with semi-persistent scheduling in accordance with a SPS configuration provided by the source base station, and maintaining SPS in the user equipment when the user equipment moves from the source cell to a target cell of the wireless communication network, the target cell, or transmitting the SPS configuration from the source base station to a target base station associated with a target cell, when the user equipment moves from the source cell to the target cell of the wireless communication network, or transmitting a new identifier for SPS control signaling to the UE for the target cell, when the source base station is for serving the source cell and the target cell.

Another embodiment may have a non-transitory digital storage medium having a computer program stored thereon to perform the method, the method having the steps of: serving a user equipment by a source base station of a source cell of a wireless communication network, the wireless communication network including a plurality of cells, each cell having a base station, wherein the user equipment is configured with semi-persistent scheduling in accordance with a SPS configuration provided by the source base station, and maintaining SPS in the user equipment when the user equipment moves from the source cell to a target cell of the wireless communication network, the target cell, or transmitting the SPS configuration from the source base station to a target base station associated with a target cell, when the user equipment moves from the source cell to the target cell of the wireless communication network, or transmitting a new identifier for SPS control signaling to the UE for the target cell, when the source base station is for serving the source cell and the target cell, when said computer program is run by a computer.

BRIEF DESCRIPTION OF THE DRAWINGS

Embodiments of the present invention will be detailed subsequently referring to the appended drawings, in which:

FIG. 3 shows an example of a conventional SPS configuration;

FIG. 7 shows an embodiment of a modified RRC message used to update the SPS C-RNTI in accordance with embodiments of the present invention;

FIG. 8 shows an embodiment of a modified SPS configuration message including a Keep on Handover flag.

DETAILED DESCRIPTION OF THE INVENTION

In the following, embodiments of the present invention are described in further detail with reference to the enclosed drawings in which elements having the same or similar function are referenced by the same reference signs.

Embodiments of a first aspect of the inventive approach will now be described. In accordance with the first aspect, the present invention provides for continuous or non-interrupted SPS of the user equipment after a handover.

Figure 4:
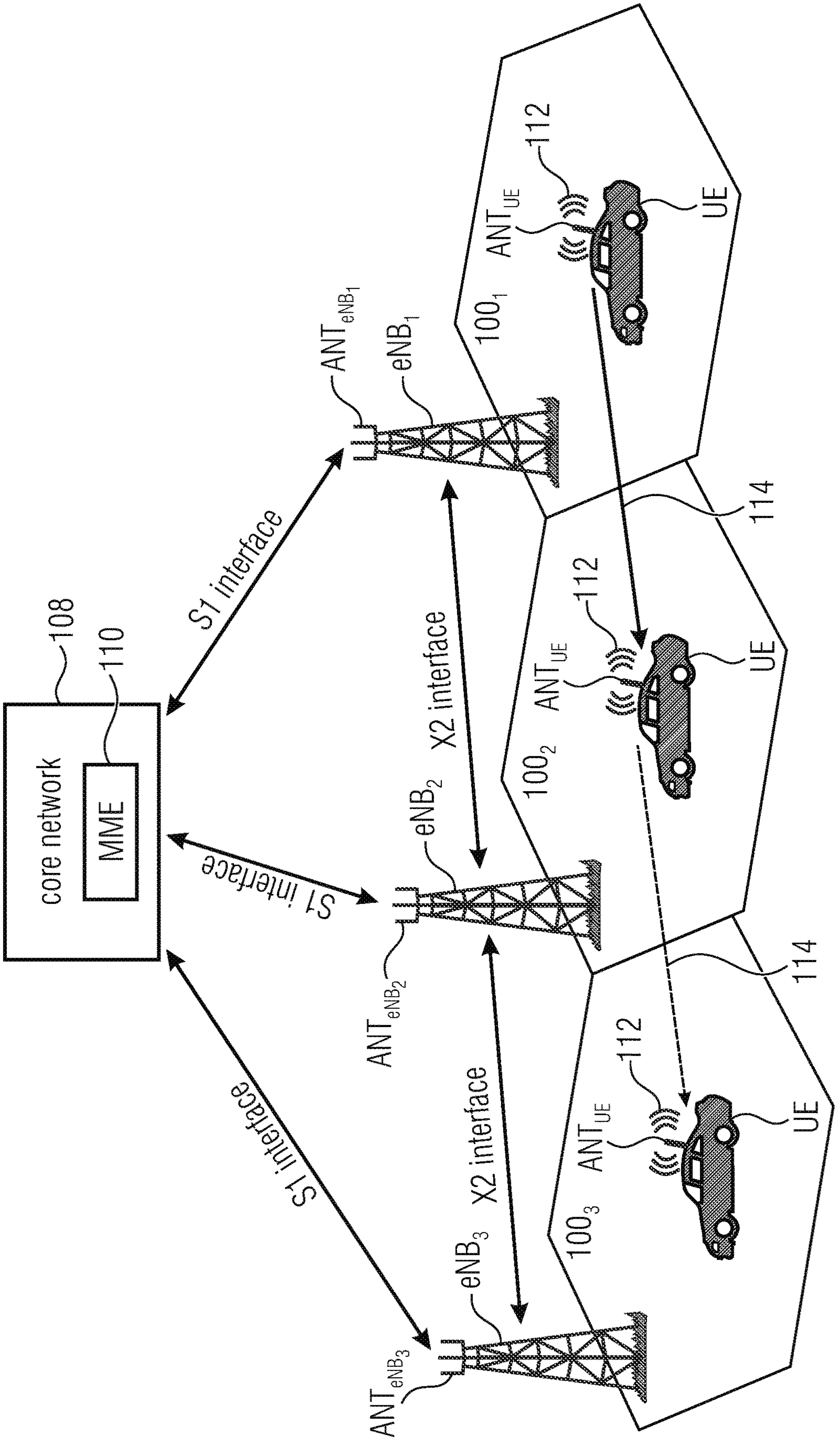
FIG. 4 shows a part of a wireless communication network similar to the one described above with reference to FIG. 1.

FIG. 4 shows a part of a wireless communication network similar to the one described above with reference to FIG. 1. Three cells $\mathbf{100}_1$ to $\mathbf{100}_3$ are shown. Each cell $\mathbf{100}_1$ to $\mathbf{100}_3$ includes a base station $eNB_1$ to $eNB_3$. The core network 108 of the wireless communication network is schematically represented which includes the mobile management entity (MME) 110. The base stations $eNB_1$ to $eNB_3$ are connected to the core network 108 via the S1 interface. Further, the base stations $eNB_1$ to $eNB_3$ are directly connected with each other via the X2 interface. The UE is a mobile terminal provided in an automobile. In other embodiments, the UE may by any kind of vehicular device. The UE includes an antenna $ANT_{UE}$ to receive/transmit a radio signal 112. Each of the base stations $eNB_1$ to $eNB_3$ includes a respective antenna $ANT_{eNB1}$ to $ANT_{eNB3}$ to receive/transmit the radio signal 112. The UE is initially located in the cell $\mathbf{100}_1$, also referred to as the source cell. The base station $eNB_1$ associated with the source cell $\mathbf{100}_1$ serves the UE, i.e., the UE is connected to the wireless communication network via the base station $eNB_1$ to receive/transmit data in a downlink/uplink connection. The UE may be within an automobile or may be part of the automobile. The UE is assumed to travel at a high speed and as the UE travels it will eventually leave the source cell $\mathbf{100}_1$. In accordance with its moving trajectory 114, the UE will reach the cell $\mathbf{100}_2$, also referred to as the target cell. When moving from the source cell $\mathbf{100}_1$ to the target cell $\mathbf{100}_2$, a handover will be performed so that the UE will be served by the target base station $eNB_2$ of the target cell $\mathbf{100}_2$ following the handover. As the UE keeps on moving in accordance with the moving trajectory 114, it will eventually leave the cell $\mathbf{100}_2$ which is now the source cell and enter into the new target cell $\mathbf{100}_3$ so that another handover occurs and the UE, following the handover, will be served by the base station $eNB_3$. An example of a handover procedure and the respective messages exchanged between the UE, the source base station, the target base station and the MME 110 as well as the serving gateway is described in reference [6]. The handover may be triggered by the core network, e.g. the MME 110, or it may be triggered by the UE.

The UE may be configured with SPS. Currently SPS is cell-based, i.e., the UE will be configured by the base station $eNB_1$ with SPS. The base station $eNB_1$ issues one or more control messages, such as DCI messages to activate SPS and to allocate resources in accordance with the SPS configuration. SPS will be carried out as long as the UE is within the cell $\mathbf{100}_1$. After the handover and once the UE reached the target cell $\mathbf{100}_2$ to be served by the base station $eNB_2$, the UE is newly configured with SPS in the target cell $\mathbf{100}_2$. Also a new identifier for SPS control signaling, like the SPS C-RNTI in a LTE system, may be issued by the target base station $eNB_2$. RNTI in general is an identifier for SPS control signaling which may be named differently in other environments. For example, in a V2X environment a new RNTI may be provided for up to eight SPS configurations.

In accordance with the present invention, newly configuring the UE with SPS following a handover is avoided. The UE, when moving from the source cell $\mathbf{100}_1$ to the target cell $\mathbf{100}_2$, e.g., when performing a handover, maintains the SPS. In accordance with embodiments, it may only be needed to re-activate the SPS by an activation signal from the target base station $eNB_2$ without the need to provide a complete and new configuration of the UE by the target base station. In accordance with embodiments also a new identifier for SPS control signaling, like the SPS C-RNTI, is issued.

In accordance with further embodiments of the present invention, to maintain SPS the SPS configuration that was used, for example by the source base station $eNB_1$ to configure the UE with SPS, is forwarded to the target base station $eNB_2$ upon the handover. For example, the X2 interface may be used to pass the SPS configuration from the source base station $eNB_1$ to the target base station $eNB_2$. In other embodiments, the SPS configuration may be passed from the source base station $eNB_1$ to the target base station $eNB_2$ via the core network using the S1 interfaces of the respective base stations.

In yet other embodiments, the UE may directly transmit the SPS configurations during the handover procedure to the target $eNB_2$. No new configuration or reconfiguration of the SPS is needed following the handover of the UE from the source cell $\mathbf{100}_1$ to the target cell $\mathbf{100}_2$, which is then the new source cell. The UE maintains the SPS configuration and the target base station $eNB_2$ receives the SPS configuration implemented in the UE and may continue with the SPS on the basis of the received SPS configuration. In accordance with embodiments, an activation signal may be sent out by the target base station $eNB_2$ to indicate to the UE that SPS is continued. In accordance with other embodiments, the activation may occur responsive to a resource assignment for SPS by the target base station.

In accordance with embodiments, in addition to passing the SPS configuration to the target base station $eNB_2$, the target base station may update the SPS C-RNTI and inform the UE accordingly, for example in a situation in which the SPS C-RNTI has been used in the source cell $\mathbf{100}_1$ is occupied, blocked or otherwise used in the target cell $\mathbf{100}_2$.

In FIG. 4, the UE is either within the automobile or is part of the automobile. In accordance with other embodiments, the UE may be another kind of mobile terminal, for example a handheld device or a sensor operating in accordance with the NB-IOT standard. The sensor may be part of the automobile or it may be part of another moving entity such as a high speed train. The user of the UE may be a passenger within the vehicle travelling on a highway or the user may be a passenger in a high speed train or an airplane. In such scenarios, the UE will experience frequent handovers and, in accordance with the inventive approach, any reconfiguration of the SPS is avoided, as the UE maintains the one or more current SPS configurations, which may be transferred by the source base station to the target base station via the X2 interface or via the S1 interface. In accordance with embodiments, the SN status transfer message may be used to transfer the SPS configuration(s). An example of a data structure including the SPS configuration has been described above with reference to FIG. 3.

Figure 5:
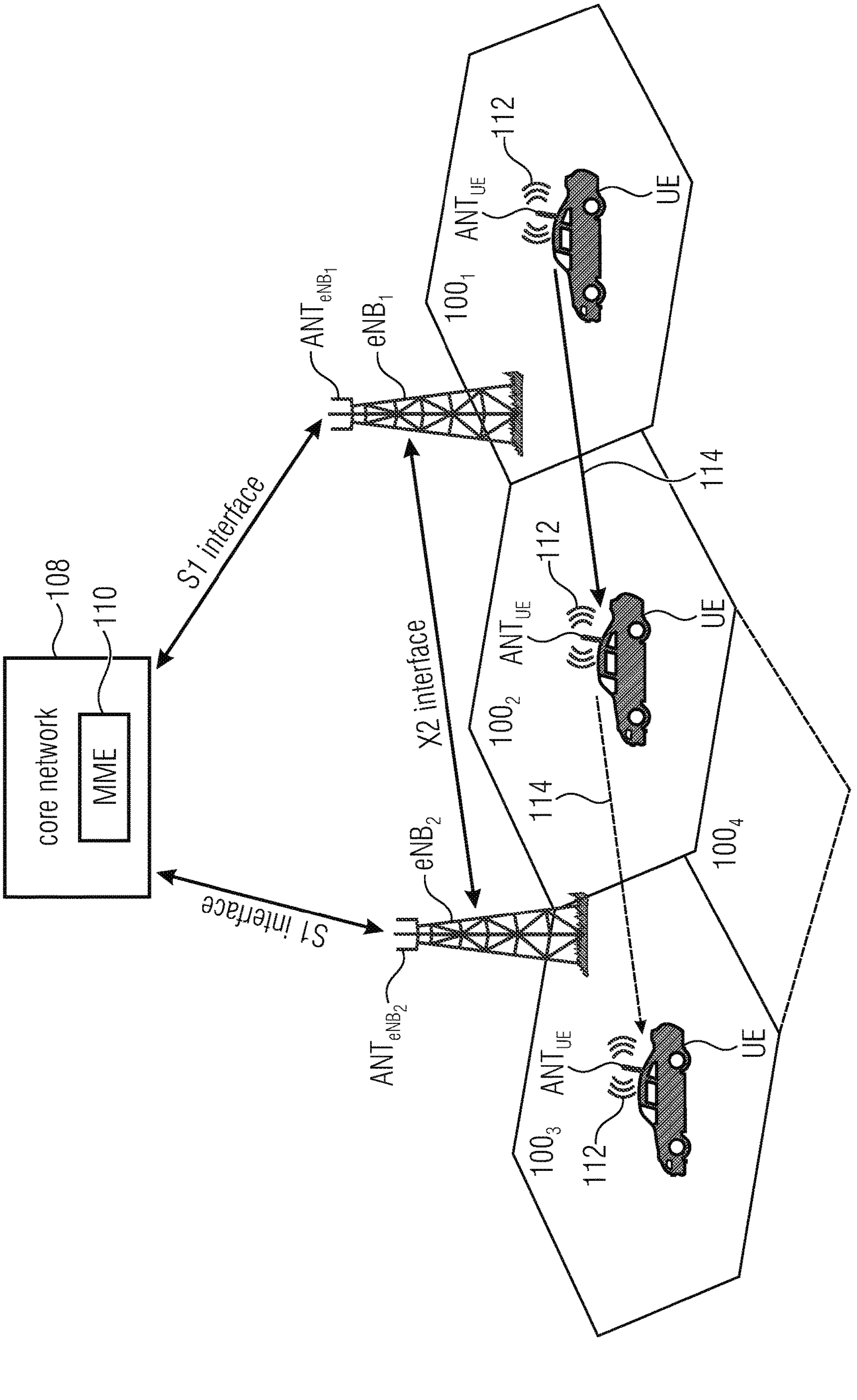
FIG. 5 shows a scenario similar to the one in FIG. 4 except that a base station is provided for a plurality of cells.

FIG. 4 shows that a base station is provided for one cell. However, a base station may also be provided for a plurality of cells as is schematically shown in FIG. 5. FIG. 5 shows a scenario similar to the one in FIG. 4 except that base station $eNB_2$ is provided for a plurality of cells, namely cells $\mathbf{100}_2$, $\mathbf{100}_3$ and $\mathbf{100}_4$. A UE within one of cells $\mathbf{100}_2$, $\mathbf{100}_3$ and $\mathbf{100}_4$ will connect to the network via base station $eNB_2$. When the UE moves, e.g., from the cell $\mathbf{100}_2$ to the cell $\mathbf{100}_3$ a handover will take place. Also in such a scenario, SPS needs to be newly configured when a handover occurs, despite the fact that the base station does not change. Newly configuring the UE with SPS following the handover is avoided. The UE, when moving from the source cell $\mathbf{100}_2$ to the target cell $\mathbf{100}_3$, i.e., when performing a handover, maintains the SPS. Since the base station $enB_2$ is aware of the SPS configuration, no transfer of the SPS configuration occurs in this scenario. In this embodiment only a new identifier for SPS control signaling, like the SPS C-RNTI, is issued following the handover.

Figure 6:
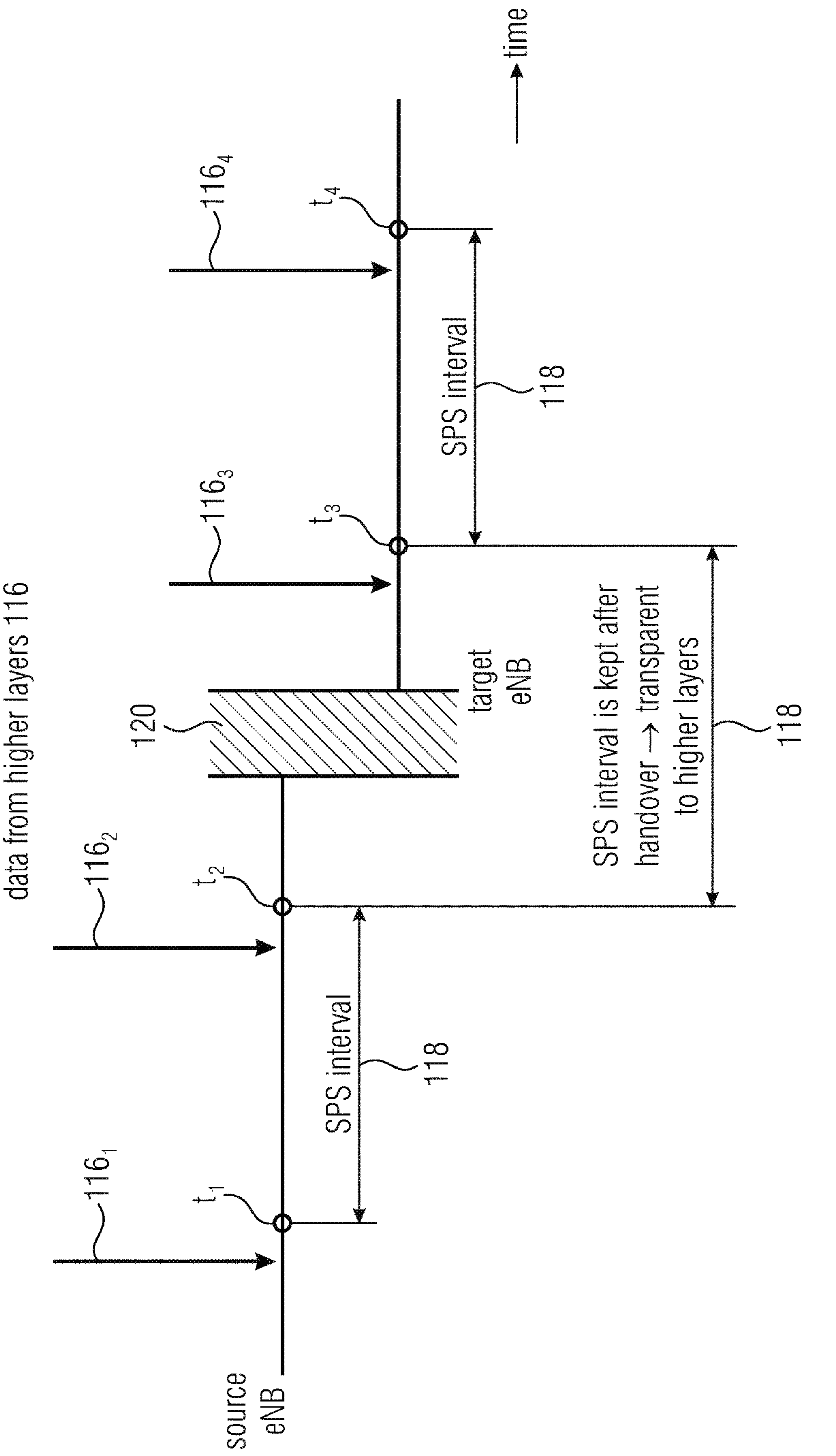
FIG. 6 is a schematic representation showing how the SPS synchronization is kept during handover in accordance with an embodiment.

In accordance with further embodiments, transferring the SPS configuration from the source cell or the source base station to the target cell or target base station further includes signaling the time of the next expected SPS packet to the target base station so as to allow the target base station to continue with the SPS with the correct timing. For example, the time to the next SPS interval may be signaled towards the target base station. In accordance with other embodiments, the period of the SPS interval which has already been used up so far is signaled to the target base station or the start of the next SPS interval is signaled as an absolute time, for example on the basis of the radio frame, the subframe number, the slot number or the TTI (Transmission Time Interval) number. In accordance with embodiments, the time of the next expected SPS packet may be signaled to the target base station either by the user equipment or by the source base station. FIG. 6 is a schematic representation showing how the SPS synchronization is kept during handover in accordance with an embodiment. FIG. 6 illustrates a downlink situation in which a user equipment is initially served by a source base station and data 116 from higher layers in the network is to be transmitted to the user equipment. The user equipment is configured with SPS having a periodicity or SPS interval 118. For example, when data $\mathbf{116}_1$ is received at the source base station, at a time $t_1$, the data $\mathbf{116}_1$ is transmitted from the base station to the user equipment on the scheduled resources. At a later time, further data $\mathbf{116}_2$ may be received at the base station which is transmitted to the user equipment at $t_2$. The time difference between $t_1$ and $t_2$ is the SPS interval 118. FIG. 6 schematically represents the handover at 120, and following the handover 120, the user equipment is no longer served by the source base station but is now served by the target base station. The target base station receives information about the SPS configuration of the UE and about the time to the next expected SPS packet so that data $\mathbf{116}_3$ for the user equipment may be transmitted by the target base station at the time $t_3$. Further data $\mathbf{116}_4$ may be transmitted from the target base station to the user equipment at the time $t_4$. The respective times $t_1$ to $t_4$ are separated by the SPS interval 118 which is defined in the SPS configuration of the user equipment. The SPS interval is kept also after the handover as the time to the next SPS transmission $t_3$ is signaled to the target base station either by the user equipment or by the source base station. This process is transparent for the higher layers of the system so that a continuous SPS even in case of a handover is enabled.

In accordance with further embodiments, the UE may inform the target base station about the SPS configuration and the SPS C-RNTI using an uplink control or data channel and the source base station may send an indication of the UE or a list of UEs to the target base station indicating if specific information will be included in the control or data channel. For example, when the X2 interface or the handover context transfer is not available, the UE may inform the target eNB on their SPS configuration through the UL control or data channel. The UE may use RRC signaling to transmit its SPS configuration and/or the time to the next SPS occurrence to the target eNB after the handover with the request to continue the same SPS configuration. This request may be acknowledged by the target eNB by directly activating the SPS via DCI or via RRC signaling.

In accordance with further embodiments, when the handover occurs, in the handover region, a dual connectivity of the UE may be provided. The UE may be connected to the source and target base stations which may help leverage a reconfiguration duration for time critical applications. SPS configuration updates may be triggered by the target base station through the X2 interface, for example for signaling the new SPS C-RNTI to the UE, and the source base station may act as the transmitter of the update message. In other words, the dual connectivity mode, in which the UE maintains dual connectivity to the source and target base stations, allows handling a situation in which the SPS C-RNTI of the source cell cannot be used in the target cell, and the target base station may already generate an update of the SPS configuration indicating also the C-RNTI to be used. The update is then performed by the source base station by transmitting the updated SPS configuration to the UE being in the handover region.

As mentioned above, in accordance with embodiments, in a situation in which the target cell $100_2$ in FIG. 4 does not allow using the same SPS C-RNTI as used by the source cell $100_1$, for example because the SPS C-RNTI is used for another UE in the target cell, either the source base station or the target base station may update the SPS C-RNTI for the UE, for example using RRC (radio resource control) signaling. This signaling may include a RRC connection reconfiguration message that is issued by the source base station $eNB_1$ to reconfigure the UE so that the SPS C-RNTI, upon the handover, is updated with the new SPS C-RNTI to be used in the target cell. In accordance with other embodiments, the SPS C-RNTI may be updated by the target base station, also by an RRC signaling, once the handover is completed.

In FIG. 4, it has been assumed that all base stations are macro base stations of the wireless communication network. However, in accordance with other embodiments, the respective base stations may all be small cell base stations, such as femto base stations, being deployed within a macro cell of the wireless communication network. In accordance with other embodiments, the base stations may include macro cell base stations and small cell base stations.

In accordance with other embodiments, the inventive approach may also be applied to UEs which are not moving at a high speed, i.e., the inventive approach may also be applied to UEs which experience a handover less frequently than a fast moving UE. Thus, the inventive approach is not limited to fast travelling UEs.

In accordance with embodiments, the SPS C-RNTI for the UE may be updated using an RRC (radio resource control) signaling. This signaling may include a RRC connection reconfiguration message that is issued by the source base station to reconfigure the UE so that the SPS C-RNTI, upon the handover, is updated with the new SPS C-RNTI to be used in the target cell. In accordance with other embodiments, the SPS C-RNTI may be updated by the target base station, also by an RRC signaling, once the handover is completed. FIG. 7 shows an embodiment of a modified RRC message used to update the SPS C-RNTI in accordance with embodiments of the present invention. When compared to the SPS-configuration message depicted in FIG. 3, the RRC message to update the SPS C-RNTI is extended to include the entry "newSemiPersistSchedC-RNTI" 130, the entry "oldSemiPersistSchedC-RNTI" 132, the entry "update NULL" 134 and the entry "update NULL" 136. The RRC message as depicted in FIG. 7 may be used by the source base station which may request a SPS-C-RNTI to be used in the target cell from the target base station, for example via the X2 interface. Prior to the handover or reconnection of the UE to the target cell, the update message may be issued. The source base station generates the update message and includes into entry 130 the new SPS C-RNTI received from the target base station, while the currently used SPS C-RNTI of the source base station is still indicated at entry 132 so that, despite the receipt of the update, as the entries 134 and 136 are still indicated as "null", the UE continues to use the old or source SPS C-RNTI. Once the handover is completed, the target base station may update the configuration by changing the entry 134 and 136 so that it is indicated that now the new SPS C-RNTI for the target cell $100_2$ is to be used. The SPS update message as indicated in FIG. 7 may be based on the SPS-Config RRC message as it is described in reference [7]. FIG. 7 shows at 138 schematically an embodiment in accordance with which the above described information about the time to the next SPS is included in the SPS configuration.

In accordance with other embodiments of the present invention, the UE which maintains its SPS configuration may be reactivated following a handover by the target base station. The initial SPS configuration may be modified to include a "Keep on Handover" flag which, when activated, causes the UE to wait for a certain time after the handover for a reactivation of SPS by the target base station and, in case no reactivation is received, the SPS is suspended. The reactivation may be a signal from the target base station which may include a new SPS C-RNTI. In case no new SPS C-RNTI is included, the currently used SPS C-RNTI is considered to be still valid and the UE keeps using this SPS C-RNTI. This may be done by a corresponding RRC signaling to change the SPS C-RNTI or directly by a DCI activation with the old RNTI or a new one, if assigned by the source eNB. When the SPS is not reactivated within this certain time, the UE releases its SPS configuration. FIG. 8 shows an embodiment of a modified SPS configuration message, more specifically a portion of the SPS configuration message for the downlink and for the uplink is shown including the additional entries 140 and 142 defining the Keep on Handover flag.

In the following, a second aspect of the present invention will be described in further detail. It is noted, that the second aspect described in the following, can be used in combination with the first aspect described above or it may be used independent of the first aspect. In accordance with the second aspect of the present invention, the signaling of control messages is reduced by providing a single control message or DCI message to the user equipment which is configured with SPS for the activation of a resource allocation of one or more SPS configurations, or for activating a plurality of SPS configurations, or for addressing a group of SPS configurations by a single DCI message. Instead of using separate DCI messages for activating the SPS in the user equipment and for the resource allocation or for reconfiguring the resource allocation in case of changing channel properties, in accordance with embodiments, initially, when the SPS is to be started, the user equipment receives a single DCI message which causes SPS to be activated and which may also include the resource allocation information. The second aspect of the present invention may also be used together with the above described first aspect providing for a continuous SPS in case of a handover.

Figure 9:
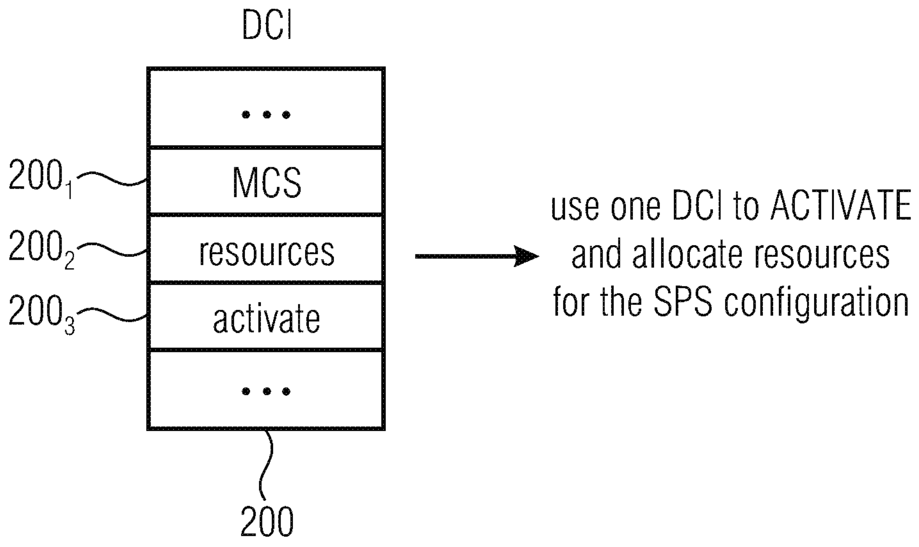
FIG. 9 shows a schematic representation of a SPS DCI message 200 including a number of fields for controlling the UE being configured with SPS using a single SPS configuration.

In the following, embodiments of the inventive approach in accordance with the second aspect will be described in further detail. FIG. 9 shows a schematic representation of a SPS DCI message 200 including a number of fields for controlling the UE being configured with SPS using a single SPS configuration. In the embodiment of FIG. 9, the DCI message 200 includes information about the modulation and coding scheme $200_1$, information about the resources $200_2$ to be allocated for the respective SPS configuration for which the DCI message is provided, and information $200_3$ which causes the SPS in the UE to be activated. Thus, one or a single DCI message 200 is used to activate the SPS in the user equipment and to allocate resources for the SPS configuration. Thus, in accordance with the embodiment described with reference to FIG. 9, signaling overhead for sending a plurality of DCI control messages, namely separate DCI control messages to activate and allocate resources is avoided as the activation and resource allocation is done in a single DCI message.

Figure 10:
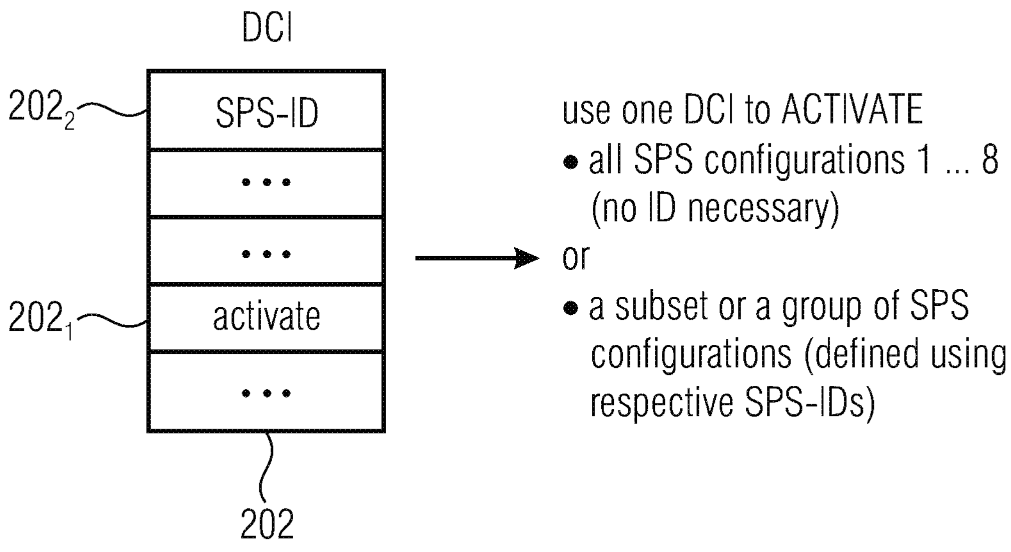
FIG. 10 shows a further embodiment of the second aspect of the inventive approach in accordance with which it is assumed that a user equipment is scheduled with SPS using a plurality of different SPS configurations.

FIG. 10 shows a further embodiment of the second aspect of the inventive approach in accordance with which it is assumed that a user equipment is scheduled with SPS using a plurality of different SPS configurations, as it might be implemented in V2X or V2V scenarios. For example, plural SPS configurations may be used dependent on the kind of data to be transmitted so as to meet requirements of transmission intervals which may be different for data from different entities, for example, data regarding specific information about the state of the vehicle may need to be transmitted less frequently than position information about the vehicle. Also the size of the data to be transmitted may be different. For the different kinds of data to be transmitted or to be received at the user equipment, different SPS intervals and, therefore, different SPS configurations, may be implemented at the user equipment. Also a different number of resources may be needed for the transmission. To reduce signaling overhead in such a scenario, in accordance with the embodiment depicted in FIG. 10 the SPS DCI message 202 is provided. It is assumed that the SPS DCI message 202 is for a user equipment being configured with SPS using eight different SPS configurations. The SPS DCI message 202 includes information $\mathbf{202}_1$ which causes SPS configurations to be activated upon receipt of the DCI message at the user equipment. The SPS DCI message 202 may be used to activate all of the SPS configurations or it may be used to activate a subset or a group of the SPS configurations. In the latter case, the SPS DCI message 202 includes the optional information $\mathbf{202}_2$ identifying those SPS configurations or a group of SPS configurations (see also the embodiment described below with reference to FIG. 15) to be activated upon receipt of the DCI message at the user equipment. The SPS configurations or the group SPS configurations may have associated therewith respective identifiers, also referred to as SPS-IDs, and for those SPS configurations to be activated, the field $\mathbf{202}_2$ includes the corresponding SPS-IDs. When only activating the SPS configurations no additional information concerning the modulation and coding scheme may be needed. Thus, in accordance with the embodiment of FIG. 10, only one DCI message or a single DCI message is used to activate all or a subset of the SPS configurations with which a user equipment may be configured, thereby reducing the signaling overhead to a single DCI message rather than sending up to eight different DCI messages for activating each of the SPS configurations individually. The DCI message 202 does not cause any resource allocation, this may be done by a separate DCI message sent at a later time. This later DCI message may be an individual message for each of the SPS configurations or it may be a combined SPS DCI indicating the resources for all or the subset of activated SPS configurations with which the user equipment is configured.

Figure 11:
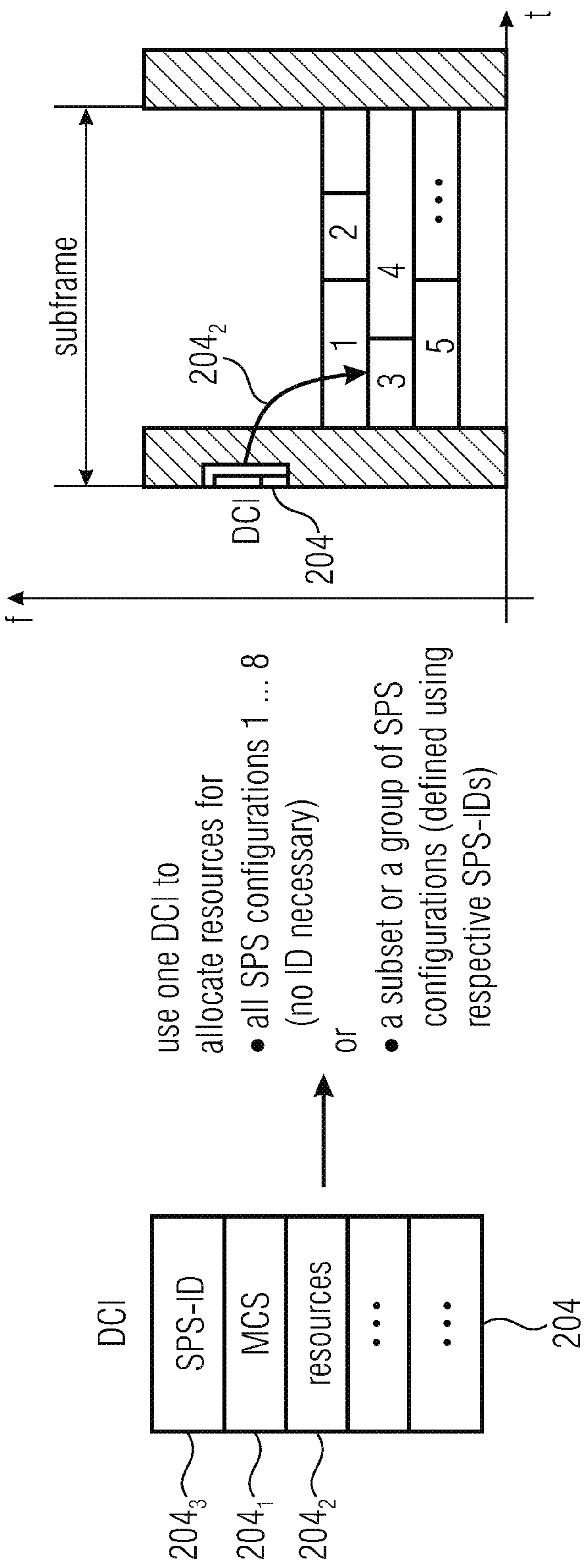
FIG. 11 shows an embodiment of a DCI message to allocate resources to SPS configurations 1 to 8 that may be used in a user equipment configured with SPS.

FIG. 11 shows an embodiment of a DCI message to allocate resources to all or a subset of SPS configurations 1 to 8 that may be used in a user equipment configured with SPS. The SPS DCI message 204 is provided which includes information $\mathbf{204}_1$ about the modulation and coding scheme. The SPS DCI message 204 includes information $\mathbf{204}_2$ about resources to be allocated for the SPS configurations, e.g., dependent on the data size defined by the SPS configuration. The SPS DCI message 204 may be used to allocate the resources for all of the SPS configurations or it may be used to allocate the resources for a subset or a group of the SPS configurations. In the latter case, the SPS DCI message 204 includes the optional information $\mathbf{204}_3$ identifying those SPS configurations or a group of SPS configurations (see also the embodiment described below with reference to FIG. 15) for which resources are to be allocated upon receipt of the DCI message at the user equipment. The SPS configurations or the group SPS configurations may have associated therewith respective identifiers, also referred to as SPS-IDs, and for those SPS configurations for which resources are to be allocated, the field $\mathbf{204}_3$ includes the corresponding SPS-IDs. In the embodiment of FIG. 11, it is assumed that up to eight SPS configurations are configured in the UE, and the DCI message 204 signals in field $\mathbf{204}_2$ for all or each addressed SPS configuration the respective resources to be allocated. For example, a first set of resources or resource elements may be assigned to the SPS configuration 1, and the following resource elements are allocated to SPS configurations 2 to 8. This is schematically represented on the right hand side of FIG. 11 showing the subframe and the DCI message $\mathbf{200}_4$ that is transmitted in the PDCCH and includes the resource information $\mathbf{204}_2$ which, as is schematically indicated in the subframe, points to the respective resource elements. Thus, in accordance with the embodiment of FIG. 11, one DCI message or a single DCI message is used to allocate the resources for all or a subset of the SPS configurations 1 to 8.

Figure 12:
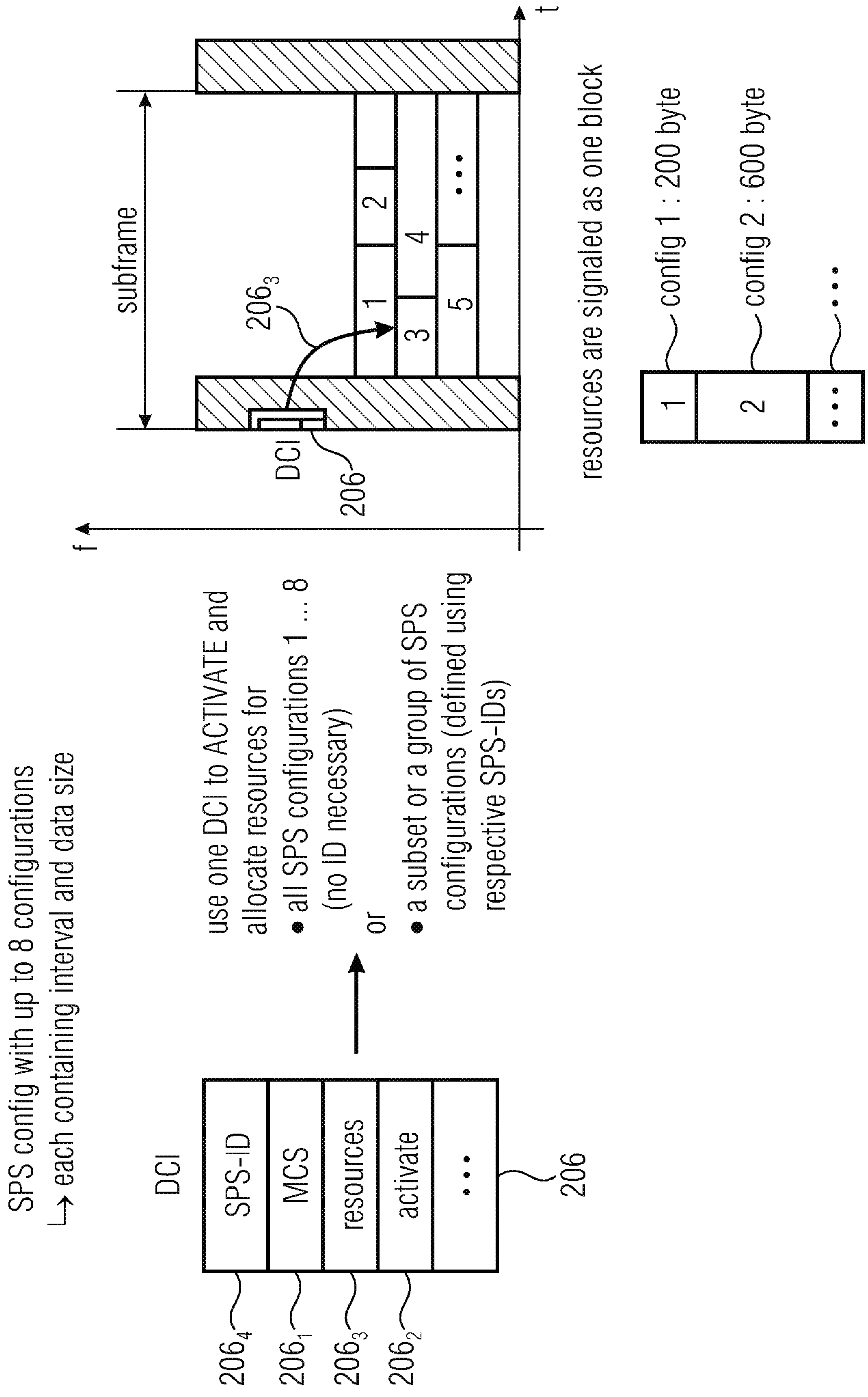
FIG. 12 shows another embodiment of the second aspect of the inventive approach in accordance with which it is assumed, again, that the user equipment is configured with SPS using up to eight SPS configurations 1 to 8 and each of the SPS configurations includes a specific SPS interval and a specific data size.

FIG. 12 shows another embodiment of the second aspect of the inventive approach in accordance with which it is assumed, again, that the user equipment is configured with SPS using up to eight SPS configurations 1 to 8 and each of the SPS configurations includes a specific SPS interval and a specific data size. The embodiment of FIG. 12 combines the above described embodiments of FIG. 10 and FIG. 11 in that the DCI message 206 activates and allocates resources for all or a subset of the SPS configurations 1 to 8. The DCI message 206 includes the information about the modulation and coding scheme $\mathbf{206}_1$ to be used and, as needed, further control information. The SPS DCI message 206 includes information $\mathbf{206}_2$ which causes SPS configurations to be activated upon receipt of the DCI message at the user equipment, and information $\mathbf{206}_3$ about resources to be allocated for the SPS configurations, e.g., dependent on the data size defined by the SPS configuration. The SPS DCI message 206 may be used to activate and allocate the and resources for all of the SPS configurations or it may be used to activate and allocate the resources for a subset or a group of the SPS configurations. In the latter case, the SPS DCI message 206 includes the optional information $\mathbf{206}_4$ identifying those SPS configurations or a group of SPS configurations (see also the embodiment described below with reference to FIG. 15) to be activated and for which resources are to be allocated upon receipt of the DCI message at the user equipment. The SPS configurations or the group SPS configurations may have associated therewith respective identifiers, also referred to as SPS-IDs, and for those SPS configurations which are activated and for which resources are allocated, the field $\mathbf{206}_4$ includes the corresponding SPS-IDs. Thus, in the embodiment of FIG. 12, one DCI message or a single DCI message is used to activate and allocate resources for one or more of the SPS configurations 1 to 8. As described above with reference to FIG. 11, the DCI is transmitted in the PDCCH of the subframe and the resource allocation is schematically represented at $206_4$ in the right hand side of FIG. 12.

The above described embodiments of the second aspect are not limited to user equipments operated in V2V or V2X scenarios but may apply to any kind of user equipment including one or more SPS configurations to be used.

The embodiments described above reference to FIG. 9 to FIG. 12 allow for a significant reduction of control message signaling thereby reducing the control message signaling overhead. The above described approach regarding the use of one DCI message for activating and/or allocating resources for one or more SPS configurations may be used either for the downlink configuration or for the uplink configuration. In accordance with further embodiments, a single DCI message may be used for configuring the resources and activating the SPS for both the uplink and downlink transmission of data.

Figure 13:
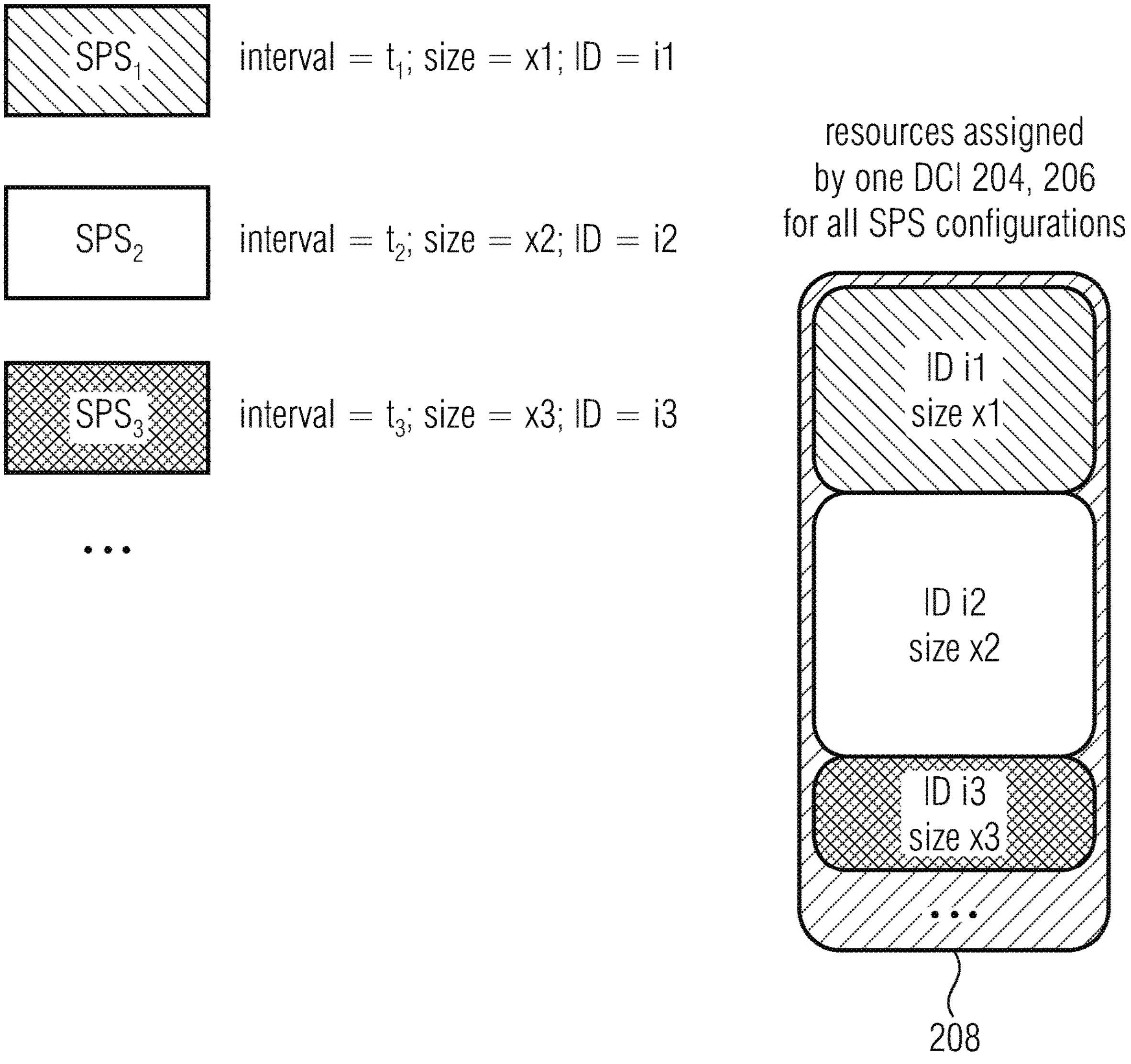
FIG. 13 an embodiment for assigning resources for several SPS configurations using one DCI message, as has been described above with reference to FIG. 11 or FIG. 12.

FIG. 13 shows an embodiment for assigning resources for several SPS configurations using one DCI message, as has been described above with reference to FIG. 11 or FIG. 12. Three SPS configurations SPS 1 to SPS 3 having different SPS time intervals t1 to t3 and different data sizes x1 to x3 are shown. Further, each SPS configuration has associated therewith an identifier ID i1, i2, i3. The DCI message 204, 206 indicates at $204_3$ or $206_4$ the resources or a block of resources to be used for all SPS configurations. The block of resources to be assigned is schematically represented in FIG. 13 at 208. The block 208 of resources may be formed by a plurality of resource elements of a subframe which may be continuous in time/frequency, or may be separate from each other. In other words, a continuous block of resource elements may be provided or a non-continuous block of resource elements may be provided, The resource elements of the respective block are allocated to the respective SPS configurations by the DCI message. In the embodiment of FIG. 13, the single DCI message 204, 206 assigns the resources for all SPS configurations $SPS_1$ to $SPS_3$ and, in case there are more SPS configurations also for the additional SPS configurations. The resources or the resource block 208 is split using the data size of each SPS configuration by assigning the resources from the first to the last configuration according to the identifier associated with the respective SPS configuration. Thus, as is shown in FIG. 13, a first set of resources or resource elements is allocated to the SPS configuration 1 having the identifier i1, and subsequent resource elements are allocated to the SPS configuration having the identifier i2. In accordance with other embodiments, the resource elements in the block 208 may be allocated in a different way, for example, the first resource elements may be assigned to one of the second or third SPS configurations, or resource elements which are non-continuous may be assigned to the same SPS configuration, for example, the SPS configuration having the ID i1 may have a first set of resource elements at the beginning of the block 208 assigned thereto, and a further number of resource elements from another part of the block 208 which is non-continuous with the first block. The one or single DCI may be used to allocate or change resources for several configurations at once by allocating the amount of resources needed for transmitting all configurations simultaneously, by defining the resources of resource block 208 and then causing an allocation of the resources from the block 208 at the user equipment in accordance with the respective configurations as described above.

Figure 14:
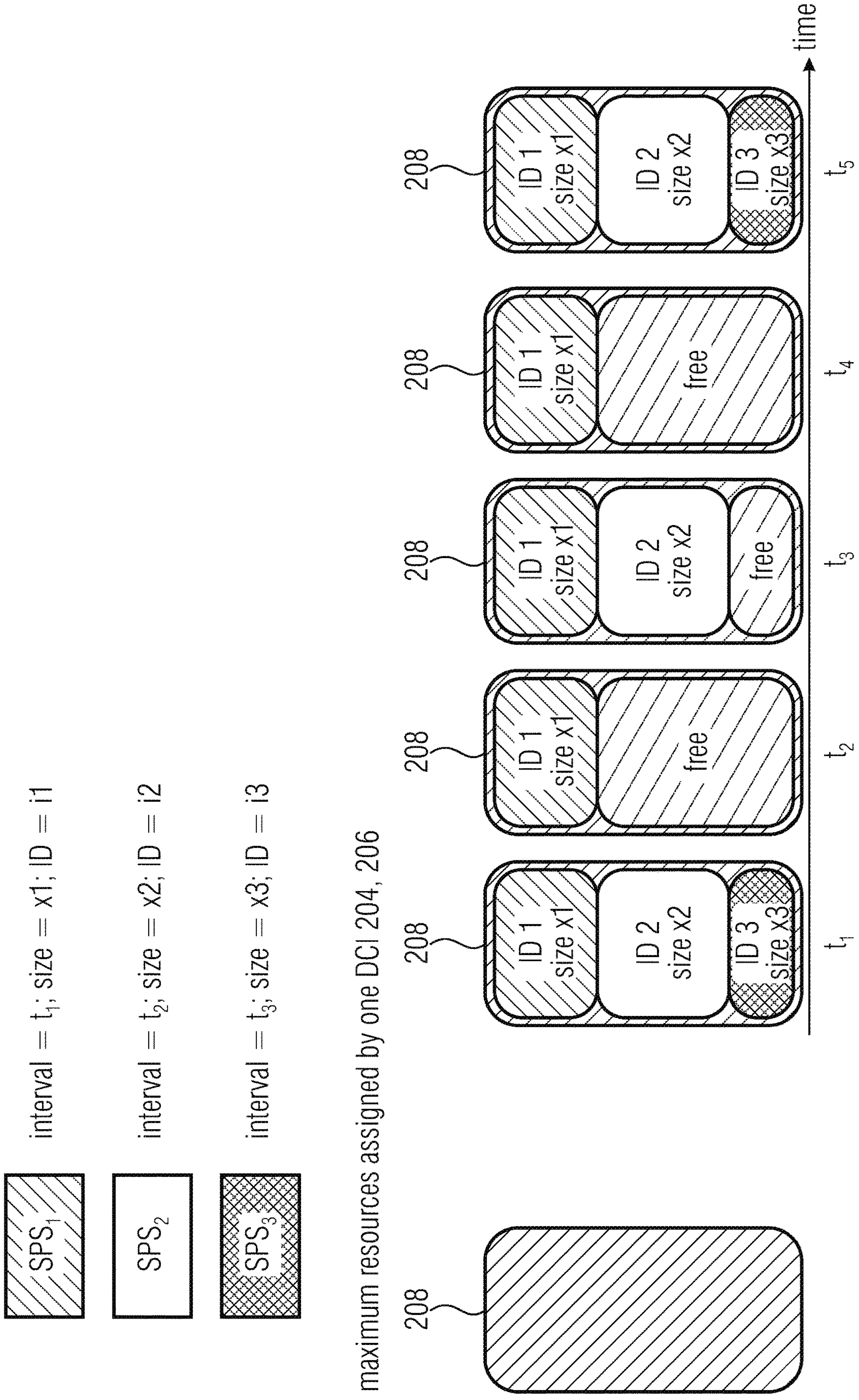
FIG. 14 illustrates another embodiment of the second aspect of the inventive approach providing for a dynamic assignment of resources to respective SPS configurations.

FIG. 14 illustrates another embodiment of the second aspect of the inventive approach providing for a dynamic assignment of resources to respective SPS configurations. FIG. 14, in a similar way to FIG. 13, shows three SPS configurations SPS1 to SPS3 having different SPS intervals, different data sizes and different IDs. On the right side of FIG. 14, the maximum resources to be assigned by a single DCI, such as DCI message 204, 206 described above with reference to FIG. 11 and FIG. 12, are shown as resource block 208. The resource block 208 may define a continuous or non-continuous number of resource elements to be allocated to the SPS configurations. When sending a DCI message to allocate resources, it may be determined that at the time t1 all three SPS configurations are used by the UE, and the resources provided by block 208 are distributed among the SPS configurations in accordance with the respective data sizes. At time $t_2$, it may be determined that currently only the first SPS configuration is used so that not all of the allocated resources of the block 208 are needed for the SPS configurations. As is shown at time $t_2$ only the resources for SPS configuration 1 are allocated, and the other resources of block 208 remain free. In accordance with embodiments, these free resource elements may be scheduled otherwise. For example, the free resource elements may be used by the same UE for non SPS traffic, or may be used by a different UE. At time $t_3$, it is determined that the UE uses the second SPS configuration in addition to the first SPS configuration, and the DCI now also allocates the resources for the second SPS configuration. The number of free resources is smaller than at time $t_2$. The situation at time $t_4$ corresponds to the one at time $t_2$, and the situation at time $t_5$ corresponds to the situation at time $t_1$.

Thus, in accordance with the embodiment of FIG. 14, the resources that may be needed for the SPS configuration are allocated at the very beginning for each SPS occurrence, however, the number of resources actually used at a specific time is determined dependent on how many SPS configurations are currently scheduled and dependent on the size or data used by the respective SPS configuration in the UE.

Figure 15:
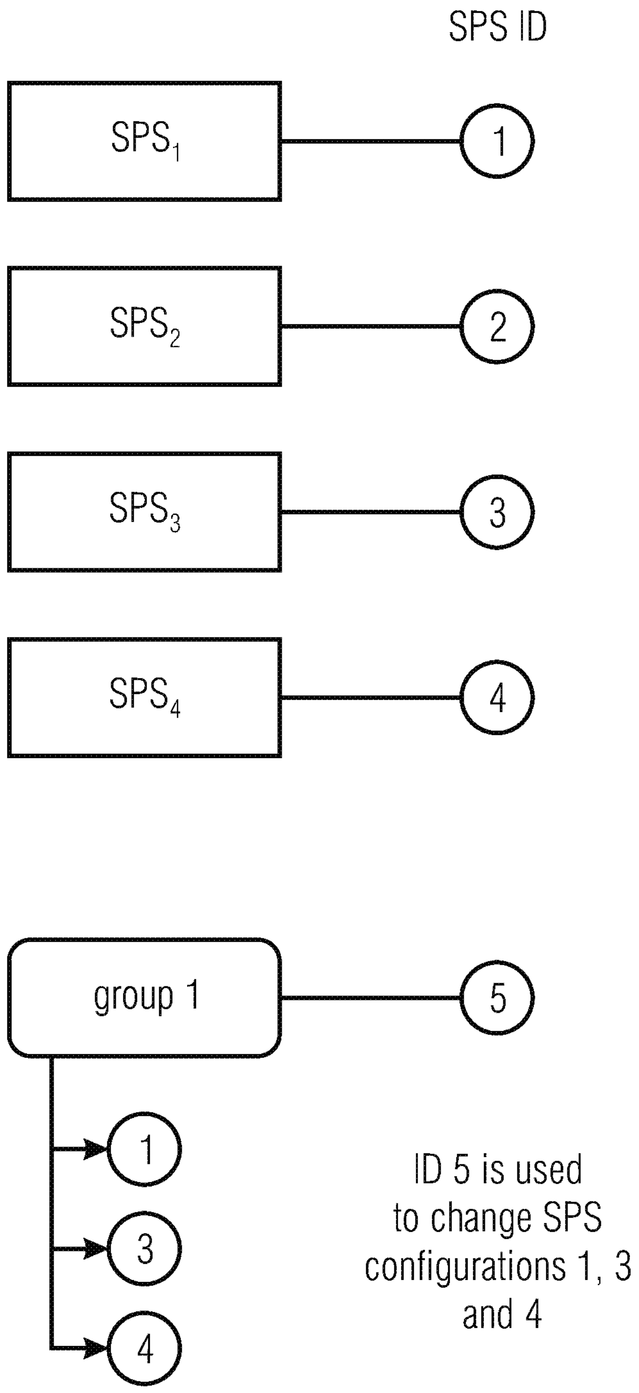
FIG. 15 shows another embodiment of the second aspect of the present invention in which a number of SPS configurations are combined into a group.

Another embodiment of the second aspect of the present invention will now be described with reference to FIG. 15. A number of SPS configurations are combined into a group. FIG. 15 shows in the upper part an example in which a UE may be configured with four SPS configurations SPS1 to SPS4, each having assigned a SPS ID. The SPS configurations may be controlled in accordance with the DCI messages described above with reference to FIG. 10 to FIG. 14. In accordance with the embodiment of FIG. 15, all of SPS configurations or a subset of SPS configurations are combined into a group. FIG. 15 shows a group having assigned thereto an ID which is used to address, within the DCI message, all members of the group, which includes SPS configurations SPS1, SPS3 and SPS4 as indicated by the respective IDs. When a DCI message is sent indicating ID5, all SPS configurations SPS1, SPS3 and SPS4 will be addressed, e.g., to be changed or modified. For example, when indicating in the respective ID fields $202_2$, $204_2$ and $206_2$ of the DCI messages 202, 204, 206 the group ID, all SPS configurations in this group will be addressed. By using one or a single DCI message, groups of SPS configurations may be switched. For example, several SPS configurations may be changed using a single DCI message. Further, SPS configurations may be added or removed semi-statically from the group, and the DCI message having the corresponding group ID will change all the configurations in the group. In accordance with embodiments, adding/removing a SPS configuration to/from a group is caused not by a DCI message, but a further control message may be used that is received at the UE. For example, a RRC message may be used. In accordance with other embodiments, an implicit removal from a group may occur, when a SPS configuration (currently belonging to a group) is reconfigured on its own with a DCI.

Figure 1:
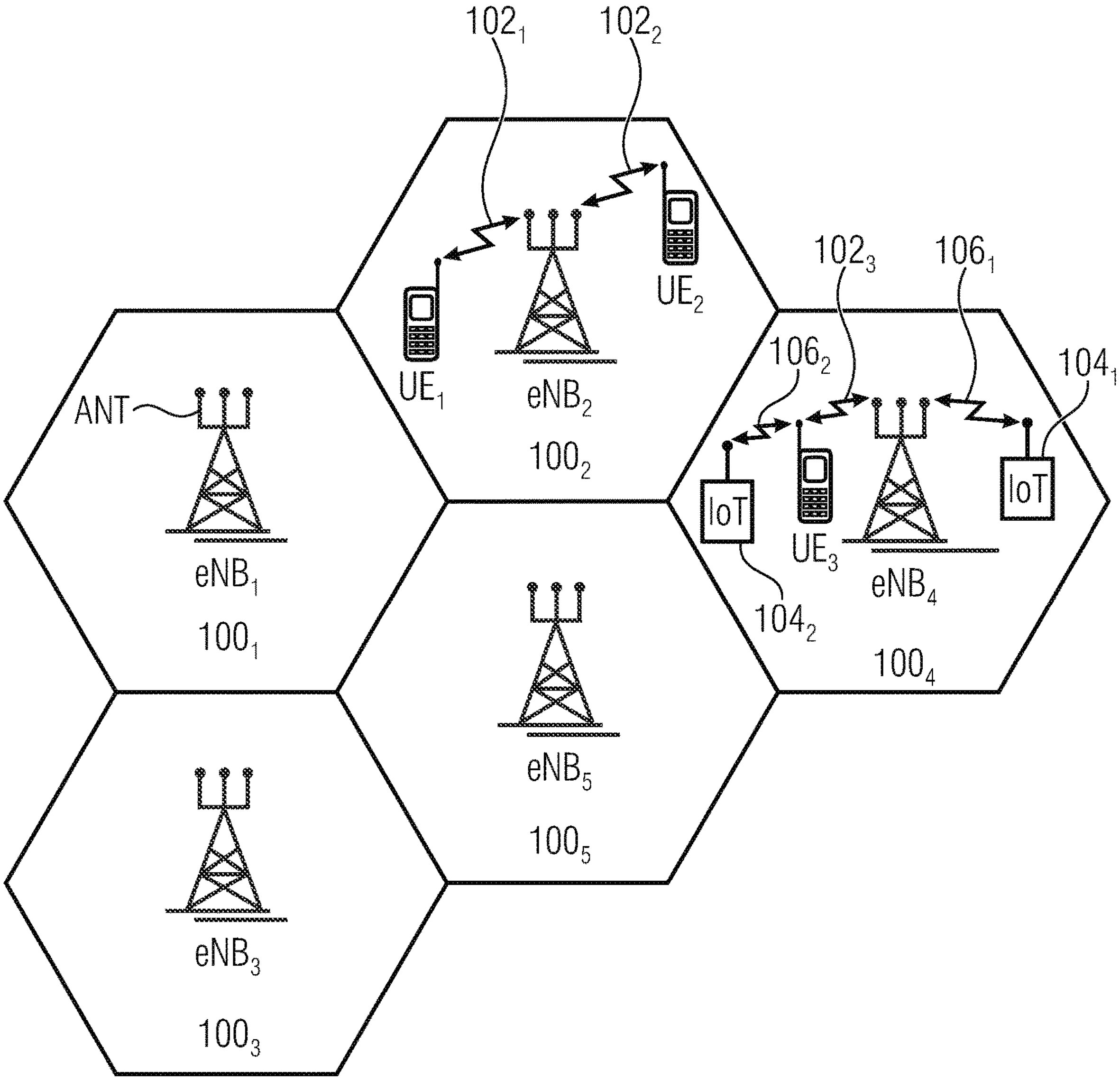
FIG. 1 shows a schematic representation of an example of a wireless communication system.
Figure 2:
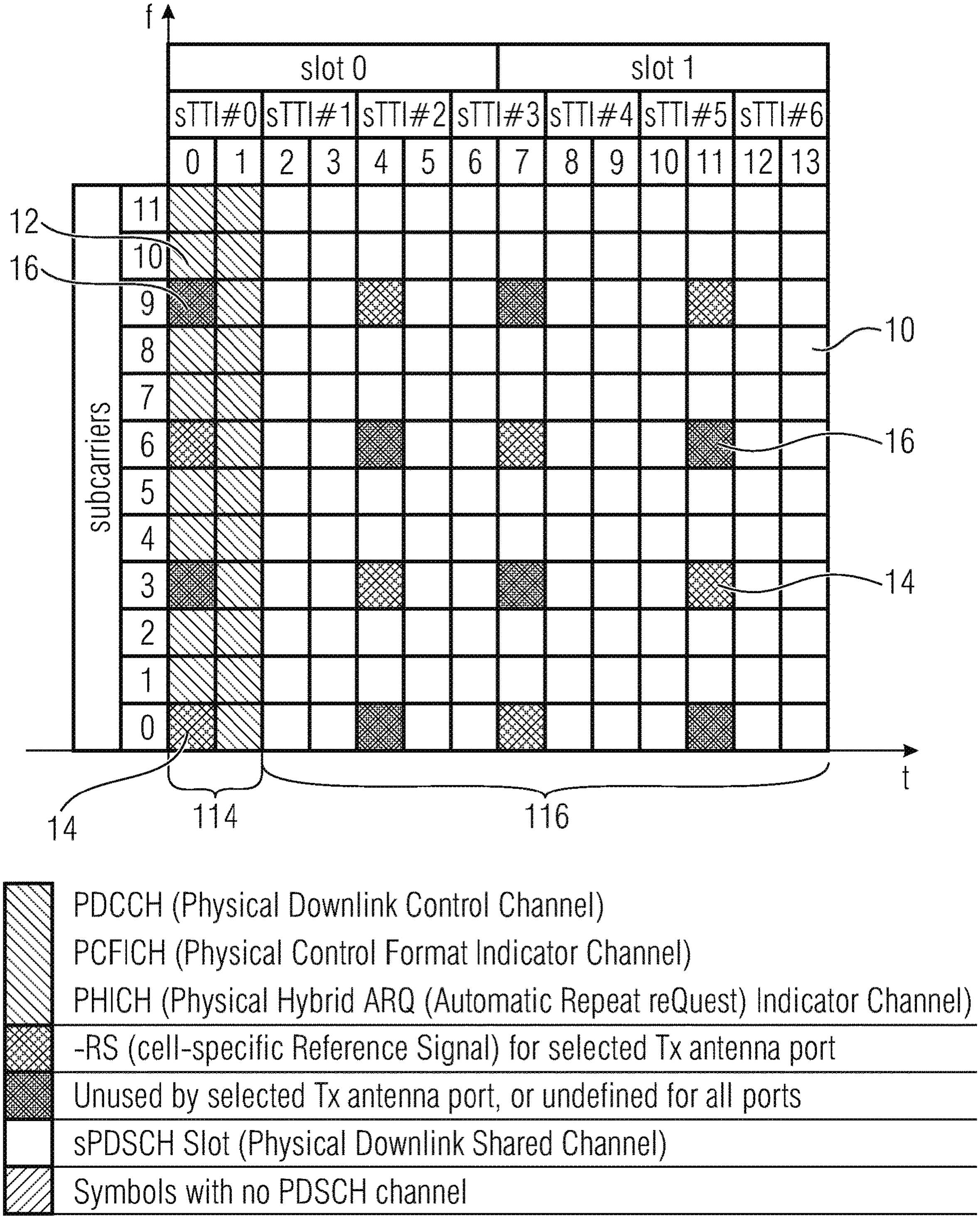
FIG. 2 shows an example of an OFDMA-subframe for two antennas ports as it may be used for a conventional LTE downlink communication.
Figure 16:
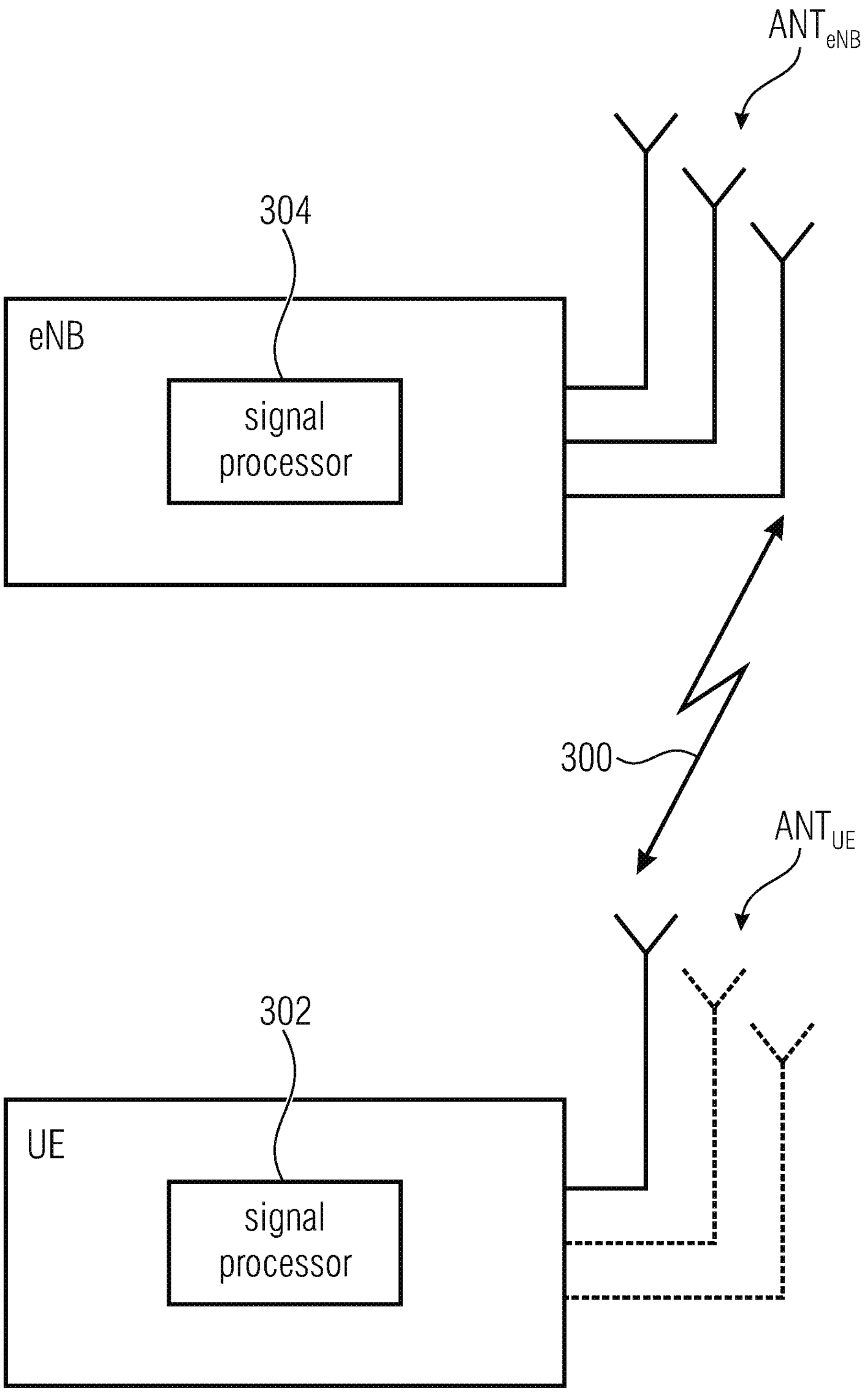
FIG. 16 is a schematic representation of a wireless communication system for transmitting information from a transmitter to a receiver.

Embodiments of the present invention may be implemented in a wireless communication system as depicted in FIG. 1 including base stations and UEs, like mobile terminals or IoT devices. FIG. 16 is a schematic representation of a wireless communication system for communicating information between a base station BS and a UE. The base station BS includes one or more antennas ANTs or an antenna array having a plurality of antenna elements. The UE includes one or more antennas $ANT_{UE}$. As is indicated by the arrow 300 signals are communicated between the base station BS and the UE via a wireless communication link, like a radio link. The wireless communication system may operate in accordance with the techniques of the first aspect and the second aspect described herein.

For example, in accordance with the first aspect the UE is served by the base station BS which in this scenario is a source base station of a source cell of the wireless communication network. The wireless communication network includes a plurality of cells, and each cell has a base station. The UE receives via the one or more antennas $ANT_{UE}$ a radio signal including a SPS configuration message from the base station so that the UE is configured with semi-persistent scheduling in accordance with the SPS configuration provided by the source base station. The UE will maintain SPS when moving from the source cell to a target cell of the wireless communication network. The UE includes a signal processor 302 to process the SPS configuration message and to maintain SPS after moving from the source cell to the target cell, e.g., following a handover. The base station BS, when operating as the source base station, serves the UE located in the source cell, and configures the UE with SPS in accordance with the SPS configuration. The base station BS comprises a signal processor 304 to generate a radio signal to transmit the SPS configuration to a target base station associated with a target cell, when the user equipment moves from the source cell to the target cell of the wireless communication network. The base station BS, when operating as the target base station, receives the SPS configuration from the source base station currently serving the UE configured with SPS in accordance with the SPS configuration. The SPS configuration is received when the UE moves from the source cell to the target cell. The base station BS comprises a signal processor 304 to process a received radio signal to obtain the SPS configuration transmitted by the source base station. Further, the signal processor 304 generates a radio signal to serve the UE located in the target cell using SPS in accordance with the received SPS configuration.

For example, in accordance with an example of the second aspect, the user equipment UE is configured with SPS in accordance with a SPS configuration. The UE receives via the one or more antennas $ANT_{UE}$ a radio signal, which includes a control message. The UE includes a signal processor 302 to process the radio signal to obtain the control message which signals an activation of the SPS configuration and which signals resources to be allocated for the SPS configuration. The base station BS configures the UE with SPS in accordance with the SPS configuration, e.g., by generating a SPS configuration message using the signal processor 304 and sending the SPS configuration message to the UE via the one or more antennas $ANT_{BS}$. Further, the base station generates and transmits a radio signal to the UE, which includes a control message. The control message signals an activation of the SPS configuration and signals resources to be allocated for the SPS configuration.

In accordance with another example of the second aspect, the user equipment UE is configured with SPS in accordance with a plurality of SPS configurations. The UE receives via the one or more antennas $ANT_{UE}$ a radio signal, which includes a control message. The UE includes a signal processor 302 to process the radio signal to obtain the control message which signals an activation of the plurality of SPS configurations. The control message may also signal resources to be allocated for the plurality of SPS configurations. The base station BS configures the UE with SPS in accordance with the plurality of SPS configurations, e.g., by generating one or more SPS configuration messages using the signal processor 304 and sending the one or more SPS configuration messages to the UE via the one or more antennas $ANT_{BS}$. Further, the generates and transmits a radio signal to the UE, which includes a control message. The control message signals an activation of the plurality of SPS configurations. The control message may also signal resources to be allocated for the plurality of SPS configurations.

In accordance with yet another example of the second aspect, the user equipment UE is configured with SPS in accordance with one or more groups of SPS configurations, a group of SPS configurations including two or more SPS configurations. The UE receives via the one or more antennas $ANT_{UE}$ a radio signal, which includes a control message. The UE includes a signal processor 302 to process the radio signal to obtain the control message which addresses the SPS configurations of one or more of the groups of SPS configurations. The base station BS configures the UE with SPS in accordance with one or more groups of SPS configurations, a group of SPS configurations including two or more SPS configurations. e.g., by generating one or more SPS configuration messages using the signal processor 304 and sending the one or more SPS configuration messages to the UE via the one or more antennas $ANT_{BS}$. Further, the generates and transmits a radio signal to the UE, which includes a control message. The control message addresses the SPS configurations of one or more of the groups of SPS configurations.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Depending on certain implementation requirements, embodiments of the invention may be implemented in hardware or in software. The implementation may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

Further embodiments are now described.

A $1^{st}$ embodiment provides a user equipment (UE), wherein

- the user equipment (UE) is configured to be served by a source base station ($eNB_1$) of a source cell ($100_1$) of a wireless communication network, the wireless communication network including a plurality of cells ($100_1$-$100_3$), each cell having a base station ($eNB_1$-$eNB_3$),
- the user equipment (UE) is configured with semi-persistent scheduling (SPS) in accordance with a SPS configuration provided by the source base station ($eNB_1$), and
- the user equipment (UE) is configured to maintain SPS when moving from the source cell ($100_1$) to a target cell ($100_2$) of the wireless communication network, the target cell ($100_2$).

A $2^{nd}$ embodiment provides the user equipment (UE) of the $1^{st}$ embodiment, wherein the a source base station serves the source cell and the target cell, and wherein the UE is configured to receive a new identifier for SPS control signaling for the target cell.

A $3^{rd}$ embodiment provides the user equipment (UE) of the $1^{st}$ or $2^{nd}$ embodiment, wherein the a source base station serves ($eNB_1$) the source cell, and wherein the target cell is served a target base station ($eNB_2$).

A $4^{th}$ embodiment provides the user equipment (UE) of the $3^{rd}$ embodiment, wherein the user equipment (UE) is configured to transmit one or more SPS configurations to the target base station ($eNB_2$) responsive to triggering a handover of the user equipment (UE) to the target base station ($eNB_2$).

A $5^{th}$ embodiment provides the user equipment (UE) of the $3^{rd}$ or $4^{th}$ embodiment, configured to transmit an identifier for SPS control signaling to the target base station ($eNB_2$).

A $6^{th}$ embodiment provides the user equipment (UE) of one of the $1^{st}$ to $5^{th}$ embodiment, wherein the SPS configuration includes a flag, wherein, when the flag is activated, the user equipment (UE) is configured to wait for a certain time after a handover for an activation of the SPS or for a resource assignment for SPS by the target base station ($eNB_2$).

A $7^{th}$ embodiment provides the user equipment (UE) of the $6^{th}$ embodiment, wherein, when no activation of the SPS or no resource assignment for SPS by the target base station ($eNB_2$) is performed during the certain time, the user equipment (UE) is configured to suspend the SPS.

An $8^{th}$ embodiment provides the user equipment (UE) of one of the $1^{st}$ to $7^{th}$ embodiment, wherein the user equipment (UE) is configured to signal to the target base station ($eNB_2$) the time of a next SPS packet.

A $9^{th}$ embodiment provides the user equipment (UE) of the $8^{th}$ embodiment, wherein the time of a next SPS packet is signaled as the time to the next SPS interval or as an absolute time.

A $10^{th}$ embodiment provides a base station, wherein

- the base station is a source base station ($eNB_1$) associated with a source cell ($100_1$) of a wireless communication network, the wireless communication network including a plurality of cells ($100_1$-$100_3$), each cell having a base station ($eNB_1$-$eNB_3$),
- the source base station ($eNB_1$) is configured to serve a user equipment (UE) located in the source cell ($100_1$) of the wireless communication network, and to configure the user equipment (UE) with semi-persistent scheduling (SPS) in accordance with a SPS configuration, and
- the source base station ($eNB_1$) is configured to transmit the SPS configuration to a target base station ($eNB_2$) associated with a target cell ($100_2$), when the user equipment (UE) moves from the source cell ($100_1$) to the target cell ($100_2$) of the wireless communication network, or to transmit a new identifier for SPS control signaling to the UE for the target cell, when the source base station is for serving the source cell and the target cell.

An $11^{th}$ embodiment provides the base station of the $10^{th}$ embodiment, wherein the source base station ($eNB_1$) is configured to transmit the SPS configuration to the target base station ($eNB_2$) via an interface directly connecting the base stations ($eNB_1$-$eNB_3$) of the wireless communication network, or via a core of the wireless communication network.

A $12^{th}$ embodiment provides the base station of the $10^{th}$ or $11^{th}$ embodiment, wherein the source base station ($eNB_1$) is configured to transmit to the target base station ($eNB_2$) an identifier for SPS control signaling for the user equipment (UE).

A $13^{th}$ embodiment provides the base station of one of the $10^{th}$ to $12^{th}$ embodiment, wherein the source base station ($eNB_1$) is configured to request from the target base station ($eNB_2$) an identifier for SPS control signaling for the user equipment (UE), to generate an update of the SPS configuration, and to transmit the updated SPS configuration to the user equipment (UE) before the handover is completed.

A 14$^{th}$ embodiment provides the base station of one of the 10$^{th}$ to 13$^{th}$ embodiment, wherein the source base station ($enB_1$) is configured to signal to the target base station ($eNB_2$) the time of a next SPS packet.

A 15$^{th}$ embodiment provides the base station of the 14$^{th}$ embodiment, wherein the time of a next SPS packet is signaled as the time to the next SPS interval or as an absolute time.

A 16$^{th}$ embodiment provides a base station, wherein the base station is a target base station ($eNB_2$) associated with a target cell ($100_2$) of a wireless communication network, the wireless communication network including a plurality of cells ($100_1$-$100_3$), each cell having a base station ($eNB_1$-$eNB_3$), the target base station ($eNB_2$) is configured to receive a semi-persistent scheduling (SPS) configuration from a source base station ($eNB_1$) associated with a source cell ($100_1$) and currently serving a user equipment (UE) configured with SPS in accordance with the SPS configuration, when the user equipment (UE) moves from the source cell ($100_1$) to the target cell ($100_2$) of the wireless communication network, and the target base station ($eNB_2$) is configured to serve the user equipment (UE) located in the target cell ($100_2$) using SPS in accordance with the received SPS configuration.

A 17$^{th}$ embodiment provides the base station of the 16$^{th}$ embodiment, wherein the target base station ($eNB_2$) is configured to transmit to the user equipment (UE) an activation signal to activate SPS in the user equipment (UE).

An 18$^{th}$ embodiment provides the base station of one of the 10$^{th}$ to 17$^{th}$ embodiment, wherein, when an identifier for SPS control signaling for the user equipment (UE) used in the source cell ($100_1$) is occupied or otherwise used in the target cell ($100_2$), the source base station ($eNB_1$) is configured to update the identifier for SPS control signaling for the user equipment (UE).

A 19$^{th}$ embodiment provides the base station of one of the 10$^{th}$ to 18$^{th}$ embodiment, wherein the base station ($eNB_1$-$eNB_3$) is configured to communicate the SPS configuration via an interface directly connecting the base stations ($eNB_1$-$eNB_3$) of the wireless communication network, or via a core of the wireless communication network.

A 20$^{th}$ embodiment provides the base station of one of the 10$^{th}$ to 19$^{th}$ embodiment, wherein the base station ($eNB_1$-$eNB_5$) is configured to communicate the SPS configuration responsive to a handover of the user equipment (UE), the handover initiated by the core (MME) of the wireless communication network core of the network or by the user equipment (UE).

A 21$^{st}$ embodiment provides the base station of one of the 10$^{th}$ to 20$^{th}$ embodiment, wherein the base station ($eNB_1$-$eNB_3$) is a macro base station or a small cell base station.

A 22$^{th}$ embodiment provides a wireless communication network, comprising:

a user equipment (UE) of one of the 1$^{st}$ to 9$^{th}$ embodiment, and a plurality of base station ($eNB_1$-$eNB_3$) of one of the 10$^{th}$ to 20$^{th}$ embodiment.

A 23$^{th}$ embodiment provides the wireless communication network of the 22$^{th}$ embodiment, wherein the wireless communication network comprises a cellular network, a wireless local area network or a wireless sensor system.

A 24$^{th}$ embodiment provides the wireless communication network of the 22$^{th}$ or 23$^{th}$ embodiment, wherein the user equipment (UE) is a mobile terminal, a vehicular device or an IoT device.

A 25$^{th}$ embodiment provides the wireless communication network of one of the 22$^{th}$ to 24$^{th}$ embodiment, using an IFFT (Inverse Fast Fourier Transform) based signal, wherein the IFFT based signal includes OFDM with CP, DFT-s-OFDM with CP, IFFT-based waveforms without CP, f-OFDM, FBMC, GFDM or UFMC.

A 26$^{th}$ embodiment provides a method, comprising:

serving a user equipment (UE) by a source base station ($eNB_1$) of a source cell ($100_1$) of a wireless communication network, the wireless communication network including a plurality of cells ($100_1$-$100_3$), each cell having a base station ($eNB_1$-$eNB_5$), wherein the user equipment (UE) is configured with semi-persistent scheduling (SPS) in accordance with a SPS configuration provided by the source base station ($eNB_1$), and maintaining SPS in the user equipment (UE) when the user equipment (UE) moves from the source cell ($100_1$) to a target cell ($100_2$) of the wireless communication network, the target cell ($100_2$).

A 27$^{th}$ embodiment provides a method, comprising:

serving a user equipment (UE) by a source base station ($eNB_1$) associated with a source cell ($100_1$) of a wireless communication network, the wireless communication network including a plurality of cells ($100_1$-$100_3$), each cell having a base station ($eNB_1$-$eNB_3$), the user equipment (UE) located in the source cell ($100_1$) of the wireless communication network, configuring the user equipment (UE) with semi-persistent scheduling (SPS) in accordance with a SPS configuration, and transmitting the SPS configuration from the source base station ($eNB_1$) to a target base station ($eNB_2$) associated with a target cell ($100_2$), when the user equipment (UE) moves from the source cell ($100_1$) to the target cell ($100_2$) of the wireless communication network, or transmitting a new identifier for SPS control signaling to the UE for the target cell, when the source base station is for serving the source cell and the target cell.

A 28$^{th}$ embodiment provides a method comprising receiving a semi-persistent scheduling (SPS) configuration at a target base station ($eNB_2$) associated with a target cell ($100_2$) of a wireless communication network, the wireless communication network including a plurality of cells ($100_1$-$100_3$), each cell having a base station ($eNB_1$-$eNB_3$), wherein the SPS configuration is received from a source base station ($eNB_1$) associated with a source cell ($100_1$) and currently serving a user equipment (UE) configured with SPS in accordance with the SPS configuration, and wherein the SPS configuration is received responsive to the user equipment (UE) moving from the source cell ($100_1$) to the target cell ($100_2$) of the wireless communication network, and serving the user equipment (UE) located in the target cell ($100_2$) by the target base station ($eNB_2$) using SPS in accordance with the received SPS configuration.

A 29$^{th}$ embodiment provides a non-transitory computer program product comprising a computer readable medium storing instructions which, when executed on a computer, carry out the method of one of the 26$^{th}$ to 28$^{th}$ embodiment.

A 30$^{th}$ embodiment provides a user equipment (UE), wherein the user equipment (UE) is configured with semi-persistent scheduling (SPS) in accordance with a SPS configuration, and the user equipment (UE) is configured to receive and process a radio signal, the radio signal including a control message (DCI), and the control message (DCI) to signal an activation of the SPS configuration and to signal resources to be allocated for the SPS configuration.

A 31$^{st}$ embodiment provides a user equipment (UE), wherein the user equipment (UE) is configured with semi-persistent scheduling (SPS) in accordance with a plurality of SPS configurations, and the user equipment (UE) is configured to receive and process a radio signal, the radio signal including a control message (DCI), and the control message (DCI) to signal an activation of the plurality of SPS configurations.

A 32$^{nd}$ embodiment provides the user equipment (UE) of the 31$^{st}$ embodiment, wherein the control message (DCI) further signals resources to be allocated for the plurality of SPS configurations.

A 33$^{th}$ embodiment provides the user equipment (UE) of the 32$^{nd}$ embodiment, wherein the control message (DCI) indicates a block of resources to be used for the plurality of SPS configurations.

A 34$^{th}$ embodiment provides the user equipment (UE) of the 33$^{rd}$ embodiment, wherein the control message (DCI) allocates the resources for one or more of the SPS configurations to the resources of the block.

A 35$^{th}$ embodiment provides the user equipment (UE) of the 34$^{th}$ embodiment, wherein resources of the block which are not allocated to a SPS configuration are scheduled otherwise.

A 36$^{th}$ embodiment provides the user equipment (UE) of one of the 30$^{th}$ to 35$^{th}$ embodiments, wherein the block of resources includes a predefined number of continuous or non-continuous resource elements of a data signal block, the data signal block having a number of symbols in the time domain and a number of sub-carriers in the frequency domain, and one resource element is made up of one symbol and one sub-carrier.

An 37$^{th}$ embodiment provides the user equipment (UE) of one of the 30$^{th}$ to 36$^{th}$ embodiments, wherein the control message (DCI) is a single control message (DCI) to activate the one or more SPS configurations and/or to allocate resources for the one or more SPS configurations.

A 38$^{th}$ embodiment provides the user equipment (UE) of one of the 30$^{th}$ to 37$^{th}$ embodiments, wherein the single control message (DCI) is used for downlink SPS configurations or for uplink SPS configurations.

A 39$^{th}$ embodiment provides the user equipment (UE) of one of the 30$^{th}$ to 38$^{th}$ embodiment, wherein the user equipment (UE) is configured with semi-persistent scheduling (SPS) in accordance with one or more groups of SPS configurations, a group of SPS configurations including two or more SPS configurations, and wherein the control message (DCI) addresses the SPS configurations of a group of SPS configurations.

An 40$^{th}$ embodiment provides a user equipment (UE), wherein the user equipment (UE) is configured with semi-persistent scheduling (SPS) in accordance with one or more groups of SPS configurations, a group of SPS configurations including two or more SPS configurations, and the user equipment (UE) is configured to receive and process a radio signal, the radio signal including a control message (DCI), and the control message (DCI) to address the SPS configurations of one or more of the groups of SPS configurations.

A 41$^{st}$ embodiment provides the user equipment (UE) of the 40$^{th}$ embodiment, wherein a further control message is received, the further control message adding/removing a SPS configuration to/from a group.

A 42$^{nd}$ embodiment provides a base station, wherein the base station is configured to configure a user equipment (UE) with semi-persistent scheduling (SPS) in accordance with a SPS configuration, and the base station is configured to transmit a radio signal to the user equipment (UE), the radio signal including a control message (DCI), and the control message (DCI) to signal an activation of the SPS configuration and to signal resources to be allocated for the SPS configuration.

A 43$^{rd}$ embodiment provides a base station, wherein the base station is configured to configure a user equipment (UE) with semi-persistent scheduling (SPS) in accordance with a plurality of SPS configurations, and the base station is configured to transmit a radio signal to the user equipment (UE), the radio signal including a control message (DCI), and the control message (DCI) to signal an activation of the plurality of SPS configurations.

a 44$^{th}$ embodiment provides the base station of the 43$^{rd}$ embodiment, wherein the control message (DCI) further signals resources to be allocated for the plurality of SPS configurations.

A 45$^{th}$ embodiment provides a base station, wherein the base station is configured to configure a user equipment (UE) with semi-persistent scheduling (SPS) in accordance with one or more groups of SPS configurations, a group of SPS configurations including two or more SPS configurations, and the base station is configured to transmit a radio signal to the user equipment (UE), the radio signal including a control message (DCI), and the control message (DCI) to address the SPS configurations of one or more of the groups of SPS configurations.

A 46$^{th}$ embodiment provides a data signal, comprising a control message for a user equipment (UE) configured by a base station with semi-persistent scheduling (SPS) in accordance with a SPS configuration, wherein the control message (DCI) signals an activation of the SPS configuration and signals resources to be allocated for the SPS configuration.

A 47$^{th}$ embodiment provides a data signal, comprising a control message for a user equipment (UE) configured by a base station with semi-persistent scheduling (SPS) in accordance with a plurality of SPS configurations, wherein the control message (DCI) signals an activation of the plurality of SPS configurations.

A 48$^{th}$ embodiment provides the data signal of the 47$^{th}$ embodiment, wherein the control message (DCI) further signals resources to be allocated for the plurality of SPS configurations.

A 49$^{th}$ embodiment provides a data signal, comprising a control message for a user equipment (UE) configured by a base station with semi-persistent scheduling (SPS) in accordance with one or more groups of SPS configurations, a group of SPS configurations including two or more SPS configurations, wherein the control message (DCI) addresses the SPS configurations of one or more of the groups of SPS configurations.

A 50$^{th}$ embodiment provides a method, comprising receiving and processing, by a user equipment (UE) a radio signal, the radio signal including a control message (DCI), wherein the user equipment (UE) is configured with semi-persistent scheduling (SPS) in accordance with a SPS configuration, and wherein the control message (DCI) signals an activation of the SPS configuration and signals resources to be allocated for the SPS configuration.

A 51$^{st}$ embodiment provides a method, comprising receiving and processing, by a user equipment (UE) a radio signal, the radio signal including a control message (DCI), wherein the user equipment (UE) is configured with semi-persistent scheduling (SPS) in accordance with a plurality of SPS configurations, and wherein the control message (DCI) signals an activation of the plurality of SPS configurations.

A 52$^{nd}$ embodiment provides the method the 51$^{st}$ embodiment, wherein the control message (DCI) further signals resources to be allocated for the plurality of SPS configurations.

A 53$^{rd}$ embodiment provides a method, comprising receiving and processing, by a user equipment (UE) a radio signal, the radio signal including a control message (DCI), wherein the user equipment (UE) is configured with semi-persistent scheduling (SPS) in accordance with one or more groups of SPS configurations, a group of SPS configurations including two or more SPS configurations, wherein the control message (DCI) to address the SPS configurations of one or more of the groups of SPS configurations.

A 54$^{th}$ embodiment provides a method, comprising configuring, by a base station, a user equipment (UE) with semi-persistent scheduling (SPS) in accordance with a SPS configuration, and transmitting, by the base station, a radio signal to the user equipment (UE), wherein the radio signal includes a control message (DCI), and the control message (DCI) signals an activation of the SPS configuration and signals resources to be allocated for the SPS configuration.

A 55$^{th}$ embodiment provides a method, comprising configuring, by a base station, a user equipment (UE) with semi-persistent scheduling (SPS) in accordance with a plurality of SPS configurations, and transmitting, by the base station, a radio signal to the user equipment (UE), wherein the radio signal includes a control message (DCI), and the control message (DCI) signals an activation of the plurality of SPS configurations.

A 56$^{th}$ embodiment provides the method of the 55$^{th}$ embodiment, wherein the control message (DCI) further signals resources to be allocated for the plurality of SPS configurations.

A 57$^{th}$ embodiment provides a method, comprising configuring, by a base station, a user equipment (UE) with semi-persistent scheduling (SPS) in accordance with one or more groups of SPS configurations, a group of SPS configurations including two or more SPS configurations, and transmitting, by the base station, a radio signal to the user equipment (UE), wherein the radio signal includes a control message (DCI), and the control message (DCI) addresses the SPS configurations of one or more of the groups of SPS configurations.

A 58$^{th}$ embodiment provides a non-transitory computer program product comprising a computer readable medium storing instructions which, when executed on a computer, carry out the method of one of the 50$^{th}$ to 57$^{th}$ embodiments.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] C. Johnson: Long Term Evolution in Bullets, 2nd edition, 2012, p. 462

[2] 3GPP TS 36.321 V13.1.0 (2016-03), p. 42ff

[3] 3GPP TS 36.213 V13.1.1 (2016-03), Section 9.2

[4] http://howltestuffworks.blogspot.de/2013/10/semi-persistent-scheduling.html

[5] 3GPP TS 36.331 V13.1.0 (2016-03), p. 354

[6] http:/lteworld.org/blog/lte-handovers-intra-e-utran-handover

[7] 3GPP TS 36.331 V12.7.0

The invention claimed is:

1. A device, comprising:

an antenna, wherein the antenna is configured to receive a radio signal; and a signal processor, wherein the signal processor is configured to process the received radio signal, wherein the device is configured to operate with semi-persistent scheduling (SPS) in accordance with one or more SPS configurations, wherein the radio signal is communicated via a control channel, wherein the control channel is a PDCCH (physical downlink control channel), wherein the control channel carries a control message, wherein the control message comprises at least a first field and a second field, wherein the first field signals an activation of at least one SPS configuration of the one or more SPS configurations, wherein if the first field identifies the at least one SPS configuration, the at least one SPS configuration is activated, wherein if the first field does not identify an SPS configuration, all of the one or more SPS configurations are activated, wherein the second field identifies resources to be allocated for the at least one SPS configuration of the one or more SPS configurations.

2. The device of claim 1, wherein the device is configured with SPS in accordance with one or more groups of SPS configurations, wherein a group of SPS configurations comprises two or more SPS configurations, wherein the control message comprises information for activation of the two or more SPS configurations of the group of SPS configurations.

3. The device of claim 1, wherein the device is configured to be served by a source base station of a source cell of a wireless communication network, wherein the wireless communication network comprises a target cell, wherein the target cell comprises a target, wherein the device is configured to maintain SPS when moving from the source cell to the target cell of the wireless communication network, and wherein the device is configured to signal to the target base station of the target cell a time of a further SPS packet when moving from the source cell to the target cell within the wireless communication network.

4. The device of claim 3, wherein the time of the further SPS packet is signaled as a time to a further SPS interval or as an absolute time.

5. A device, comprising:

a signal processor, wherein the signal processor is configured to generate a radio signal, and an antenna, wherein the antenna is configured to transmit the radio signal, wherein the device is configured to serve a second device located in a cell using semi-persistent scheduling (SPS) in accordance with one or more SPS configurations, wherein the radio signal is communicated via a control channel, wherein the control channel is a PDCCH (physical downlink control channel), wherein the control channel carries a control message for the second device, wherein the control message comprises at least a first field and a second field, wherein the first field signals an activation of at least one SPS configuration of the one or more SPS configurations, wherein if the first field identifies the at least one SPS configuration, the at least one SPS configuration is activated, wherein if the first field does not identify an SPS configuration, all of the one or more SPS configurations are activated, wherein the second field identifies resources to be allocated for the at least one SPS configuration of the one or more SPS configurations.

6. The device of claim 5, wherein the device is a source base station associated with a source cell of a wireless communication network, wherein the wireless communication network further comprises a target cell, wherein the target cell comprises a target base station, wherein the source base station is configured to transmit the one or more SPS configurations to the target base station via an interface directly connecting the source base station and the target base station, or via a core of the wireless communication network, when the second device moves from the source cell to the target cell within the wireless communication network, wherein the source base station is configured to signal to the target base station a time of a further SPS packet.

7. The device of claim 6, wherein the time of the further SPS packet is signaled as a time to a further SPS interval or as an absolute time.

8. A method, comprising:

serving a device by a base station of a cell of a wireless communication network, wherein the device is configured with semi-persistent scheduling (SPS) in accordance with one or more SPS configurations; and sending to the device a radio signal, wherein the radio signal is communicated via a control channel, wherein the control channel is a PDCCH (physical downlink control channel), wherein the control channel carries a control message, wherein the control message comprises at least a first field and a second field, wherein the first field signals an activation of at least one SPS configuration of the one or more SPS configurations, wherein in response to the first field identifying the at least one SPS configuration, the at least one SPS configuration is activated, wherein in response to the first field not identifying an SPS configuration, all of the one or more SPS configurations are activated, wherein the second field identifies resources to be allocated for the at least one SPS configuration of the one or more SPS configurations.

9. A non-transitory computer readable medium having a computer program stored thereon to perform the method of claim 8 when said computer program is executed by a processor.

10. The device of claim 1, wherein the device is a mobile terminal, a vehicular device, an Internet of Things (IoT) device or a sensor.

11. The device of claim 3, wherein the device is connected to both the source base station and the target base station when the device is in a handover region of the wireless communication network.

12. The device of claim 5, wherein the second device is configured with SPS in accordance with one or more groups of SPS configurations, wherein a group of SPS configurations comprises two or more SPS configurations, wherein the control message comprises information for activation of the two or more SPS configurations of the group of SPS configurations.

13. The method of claim 8, wherein the device is configured with SPS in accordance with one or more groups of SPS configurations, wherein a group of SPS configurations comprises two or more SPS configurations, wherein the control message comprises information for activation of the two or more SPS configurations of the group of SPS configurations.

14. The method of claim 8, wherein the base station is a source base station associated with a source cell of a wireless communication network, wherein the wireless communication network further comprises a target cell, wherein the target cell comprises a target base station, wherein the method comprises:

transmitting the one or more SPS configurations from the base station to the target base station via an interface directly connecting the base station and the target base station, or via a core of the wireless communication network, when the device moves from the source cell to the target cell within the wireless communication network; and signaling from the base station to the target base station a time of a further SPS packet.

15. The method of claim 14, further comprising signaling the time of the further SPS packet as a time to a further SPS interval or as an absolute time.

16. A method, comprising:

a device operating in a cell of a wireless communication network, wherein the cell comprises a base station, wherein the device is served by the base station, wherein the device is configured with semi-persistent scheduling (SPS) in accordance with one or more SPS configurations; and receiving at the device a radio signal from the base station, wherein the radio signal is communicated via a control channel, wherein the control channel is a PDCCH (physical downlink control channel), wherein the control channel carries a control message, wherein the control message comprises at least a first field and a second field, wherein the first field signals an activation of at least one SPS configuration of the one or more SPS configurations, wherein in response to the first field identifying the at least one SPS configuration, the at least one SPS configuration is activated, wherein in response to the first field not identifying an SPS configuration, all of the one or more SPS configurations are activated, wherein the second field identifies resources to be allocated for the at least one SPS configuration of the one or more SPS configurations.

17. The method of claim 16, wherein the device is configured with SPS in accordance with one or more groups of SPS configurations, wherein a group of SPS configurations comprises two or more SPS configurations, wherein the control message comprises information for activation of the two or more SPS configurations of the group of SPS configurations.

18. The method of claim 16, wherein the base station is a source base station associated with a source cell of a wireless communication network, wherein the wireless communication network further comprises a target cell, wherein the target cell comprises a target base station, wherein the device is configured to maintain SPS when moving from the source cell to the target cell of the wireless communication network, wherein the method further comprises the device signaling to the target base station of the target cell a time of a further SPS packet when moving from the source cell to the target cell within the wireless communication network.

19. The method of claim 18, wherein the time of the further SPS packet is signaled as a time to a further SPS interval or as an absolute time.

20. The method of claim 16, wherein the device is a mobile terminal, a vehicular device, an Internet of Things (IoT) device, or a sensor.

* * * * *